United States Patent
Shelat et al.

(10) Patent No.: US 7,698,414 B1
(45) Date of Patent: Apr. 13, 2010

(54) GLOBAL MONITORING AND STATISTICS COLLECTION FOR A PLURALITY OF COMPUTING NODES

(75) Inventors: Radha Shelat, Pune (IN); Sivaramakrishna Ramadugu Venkata, Hyderabad (IN); Navin Kabra, Pune (IN)

(73) Assignee: Symantec Operating Corporation, Mountain View, CA (US)

(*) Notice: Subject to any disclaimer, the term of this patent is extended or adjusted under 35 U.S.C. 154(b) by 1719 days.

(21) Appl. No.: 10/855,603

(22) Filed: May 27, 2004

(51) Int. Cl.
    G06F 15/173 (2006.01)
    G06F 17/30 (2006.01)
(52) U.S. Cl. .......................... 709/224; 707/10
(58) Field of Classification Search .............. 709/212, 709/213, 216–218, 224, 243, 245; 707/10, 707/201
See application file for complete search history.

(56) References Cited

U.S. PATENT DOCUMENTS

| | | | |
|---|---|---|---|
| 5,655,081 | A | 8/1997 | Bonnell et al. |
| 6,308,208 | B1 | 10/2001 | Jung et al. |
| 6,748,381 | B1 | 6/2004 | Chao et al. |
| 6,836,800 | B1 | 12/2004 | Sweet et al. |
| 6,839,769 | B2 | 1/2005 | Needham et al. |
| 7,404,006 | B1* | 7/2008 | Slaughter et al. ............ 709/238 |
| 2002/0065919 | A1 | 5/2002 | Taylor |
| 2002/0114341 | A1 | 8/2002 | Sutherland |
| 2002/0147815 | A1 | 10/2002 | Tormasov |
| 2003/0145093 | A1* | 7/2003 | Oren et al. ................. 709/229 |
| 2004/0122903 | A1* | 6/2004 | Saulpaugh et al. .......... 709/206 |

OTHER PUBLICATIONS

A. Rowstron and P. Druschel. "Pastry: Scalable, distributed object location and routing for large-scale peer-to-peer systems." In Proc. *IFIP/ACM Middleware 2001*, Heidelberg, Germany, Nov. 2001.

Zhao, et al "Tapestry: An Infrastructure for Fault-tolerant Wide-area Location and Routing" *UCB Tech. Report UCB/CSD-01-1141*. Apr. 2001.

(Continued)

*Primary Examiner*—Yemane Mesfin
(74) *Attorney, Agent, or Firm*—Meyertons, Hood, Kivlin, Kowert & Goetzel, P.C.; Jason L. Burgess

(57) ABSTRACT

A system including a plurality of nodes operable to exchange information using location-independent addresses. According to one embodiment of a method for obtaining information in a network of nodes, one or more nodes may each create an instance of a location-independent address A. The location-independent address A may represent an address for sending request messages (also referred to simply as requests) in order to obtain information or data from the one or more nodes with which the location-independent address A is associated (i.e., from the one or more nodes that create instances of the location-independent address A). According to one embodiment of a method for storing information in a network of nodes, one or more nodes may each create an instance of a location-independent address A, similarly as described above. However, instead of representing an address for sending requests to obtain information or data, in this case the location-independent address A may represent an address for sending requests to store information or data.

15 Claims, 11 Drawing Sheets

OTHER PUBLICATIONS

Stoica, et al "Chord: A Scalable Peer-to-peer Lookup Service for Internet Applications," *ACMSIGCOMM 2001*, San Diego, CA, Aug. 2001, pp. 149-160.

Manku, et al, "Symphony: Distributed Hashing in a Small World" Published in USITS, 2003.

Kubiatowicz, et al "OceanStore: An Architecture for Global-scale Persistent Storage" *Proceedings of ACM ASPLOS*, Nov. 2000.

Adya, et al; "FARSITE: Federated, Available, and Reliable Storage for an Incompletely Trusted Environment"; *Proceedings of the 5th OSDI*, Dec. 2002.

Garces-Erice, et al; "Hierarchical Peer-to-Peer Systems," In the Special issue of the *Parallel Processing Letters (PPL)*, Dec. 2003, vol. 13, No. 4.

"Large Scale Peer-to-Peer Experiments with Virtual Private Community (VPC) Framework," Iwao, et al., CIA 2002, LNAI 2446, pp. 66-81, 2002.

"BestPeer: A Self-Configurable Peer-to-Peer System," Ng, et al, Department of Computer Science, National University of Singapore, pp. 1-21.

\* cited by examiner

GLOBAL MONITORING AND STATISTICS COLLECTION FOR A PLURALITY OF COMPUTING NODES

BACKGROUND OF THE INVENTION

1. Field of the Invention

This invention relates to computer networks. More particularly, the invention relates to a system and method for monitoring and sharing statistical information among a plurality of computing nodes.

2. Description of the Related Art

In computer networks that include a plurality of computer systems or nodes, it is often necessary to collect various kinds of statistical information. For example, a node may need to obtain statistical information regarding node resource usage, file access statistics, etc., from other nodes in order to perform various operations or make decisions. The task of storing and obtaining statistical information in a network of nodes can be difficult to perform efficiently. This may be especially true in a peer-to-peer or P2P network.

As used herein, a peer-to-peer network is generally used to describe a decentralized network of peer nodes where each node may have similar capabilities and/or responsibilities. Participating peer nodes in a P2P network may communicate directly with each other. Work may be done and information may be shared through interaction among the peers. In addition, in a P2P network, a given peer node may be equally capable of serving as either a client or a server for another peer node.

A peer-to-peer network may be created to fulfill some specific need, or it may be created as a general-purpose network. Some P2P networks are created to deliver one type of service and thus typically run one application. For example, Napster was created to enable users to share music files. Other P2P networks are intended as general purpose networks which may support a large variety of applications. Any of various kinds of distributed applications may execute on a P2P network. Exemplary peer-to-peer applications include file sharing, messaging applications, distributed processing, etc.

A peer-to-peer network may be especially useful for applications which utilize distributed or shared data, in part because the reliance on centralized servers to access data can be reduced or eliminated. However, the decentralized nature of a peer-to-peer network can also make certain tasks more complicated, such as the sharing of statistical information among nodes in the network.

SUMMARY

Nodes in a system comprising a plurality of nodes may be operable to exchange information using location-independent addresses. According to one embodiment of a method for obtaining information in a network of nodes, one or more nodes may each create an instance of a location-independent address A. The location-independent address A may represent an address for sending request messages (also referred to simply as requests) in order to obtain information or data from the one or more nodes with which the location-independent address A is associated (i.e., from the one or more nodes that create instances of the location-independent address A).

As described below, in response to receiving a request addressed to the location-independent address A, each of the one or more nodes that created an instance of the location-independent address A may be configured to return information to the sender of the request. Thus, each of the one or more nodes that created an instance of the location-independent address A may manage or store information associated with the location-independent address A, i.e., the information that is returned in response to requests addressed to the location-independent address A.

In various embodiments, the one or more nodes with which the location-independent address A is associated may manage any kind of information or data to return in response to requests sent to the location-independent address A. In one embodiment the information may comprise statistical information. For example, in one embodiment the statistical information may comprise information regarding resources or properties of the nodes. In another embodiment the statistical information may comprise statistical information regarding a function performed by nodes in the system. For example, where the nodes in the system implement a distributed file sharing system, the statistical information may comprise file access statistics or file cache access statistics.

The method may further comprise a node sending a request addressed to the location-independent address A. The request may comprise a request to obtain the information associated with the location-independent address A, i.e., the information managed by each of the one or more nodes that created instances of the location-independent address A.

In response to receiving the request, each of the one or more nodes that created instances of the location-independent address A may return its respective information that the node manages in association with the location-independent address A. For example, each of the one or more nodes may return a reply message that includes the information, and the reply message may be routed back to the node that sent the request message.

According to one embodiment of a method for storing information in a network of nodes, one or more nodes may each create an instance of a location-independent address A, similarly as described above. However, instead of representing an address for sending requests to obtain information or data, in this case the location-independent address A may represent an address for sending requests to store information or data. In various embodiments, the location-independent address A may represent an address for sending requests to store information of any kind.

A node may send a request to store information to the location-independent address A. Thus, each of the one or more nodes that created an instance of the location-independent address may receive the request. The request message may include the information to be stored, e.g., statistical information to be stored. In response to the request message, each of the one or more nodes may store the information sent in the request message.

BRIEF DESCRIPTION OF THE DRAWINGS

A better understanding of the invention can be obtained when the following detailed description is considered in conjunction with the following drawings, in which.

Figure 1:
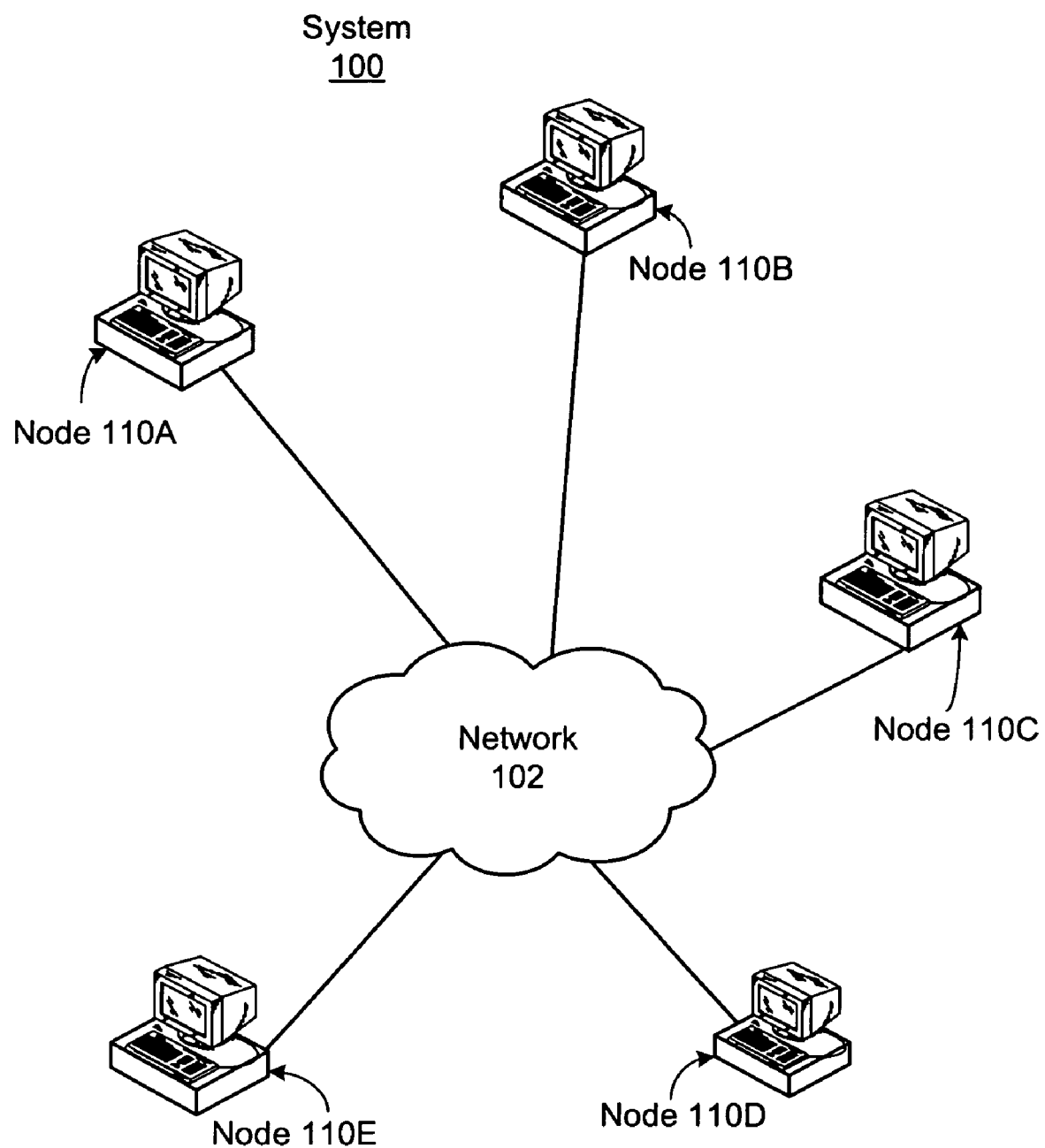
FIG. 1 illustrates one embodiment of a system including a plurality of nodes operable to share statistical information according to the techniques described herein.

While the invention is susceptible to various modifications and alternative forms, specific embodiments thereof are shown by way of example in the drawings and are described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

FIG. 1 illustrates one embodiment of a system 100 that includes a plurality of nodes (e.g., computer systems) 110. As described below with reference to FIGS. 5 and 6, the nodes may be operable to share information by utilizing location-independent addresses that represent addresses to which messages may be addressed to obtain and/or store information, e.g., statistical information. The plurality of nodes 110 may be operable to share statistical information to perform any of various functions. In one embodiment, the plurality of nodes 110 may be operable to share statistical information involved in performing distributed file sharing.

In the example of FIG. 1, the system 100 includes nodes 110A-110E, although in various embodiments any number of nodes may be present. It is noted that throughout this disclosure, drawing features identified by the same reference number followed by a letter (e.g., nodes 110A-110E) may be collectively referred to by that reference number alone (e.g., nodes 110) where appropriate.

As shown, nodes 110A-110E may be coupled through a network 102. In various embodiments, the network 102 may include any type of network or combination of networks. For example, the network 102 may include any type or combination of local area network (LAN), a wide area network (WAN), an Intranet, the Internet, etc. Exemplary local area networks include Ethernet networks, Fiber Distributed Data Interface (FDDI) networks, and token ring networks. Also, each node 110 may be coupled to the network 102 using any type of wired or wireless connection medium. For example, wired mediums may include a modem connected to plain old telephone service (POTS), Ethernet, fiber channel, etc. Wireless connection mediums may include a satellite link, a modem link through a cellular service, a wireless link such as Wi-Fi™, a wireless connection using a wireless communication protocol such as IEEE 802.11 (wireless Ethernet), Bluetooth, etc.

In one embodiment, the nodes 110 may form a peer-to-peer network. For example, the system 100 may comprise a decentralized network of nodes 110 where each node 110 may have similar capabilities and/or responsibilities. Each node 110 may communicate directly with at least a subset of the other nodes 110. In one embodiment, messages may be propagated through the system 100 in a decentralized manner. For example, in one embodiment each node 110 in the system 100 may effectively act as a message router.

In another embodiment, the nodes 110 in the system 100 may be organized or may communicate using a centralized networking methodology, or the system 100 may utilize a combination of centralized and decentralized networking methodologies. For example, some functions of the system 100 may be performed by using various nodes 110 as centralized servers, whereas other functions of the system 100 may be performed in a peer-to-peer manner.

In one embodiment, each node 110 may have an identifier (ID). The ID of a node 110 may comprise any kind of information usable to identify the node 110, such as numeric or textual information. In one embodiment, a node ID may comprise a 128-bit (or other length) Universally Unique ID (UUID). Universally Unique IDs or UUIDs may be allocated based on known art that ensures that the UUIDs are unique.

Figure 2:
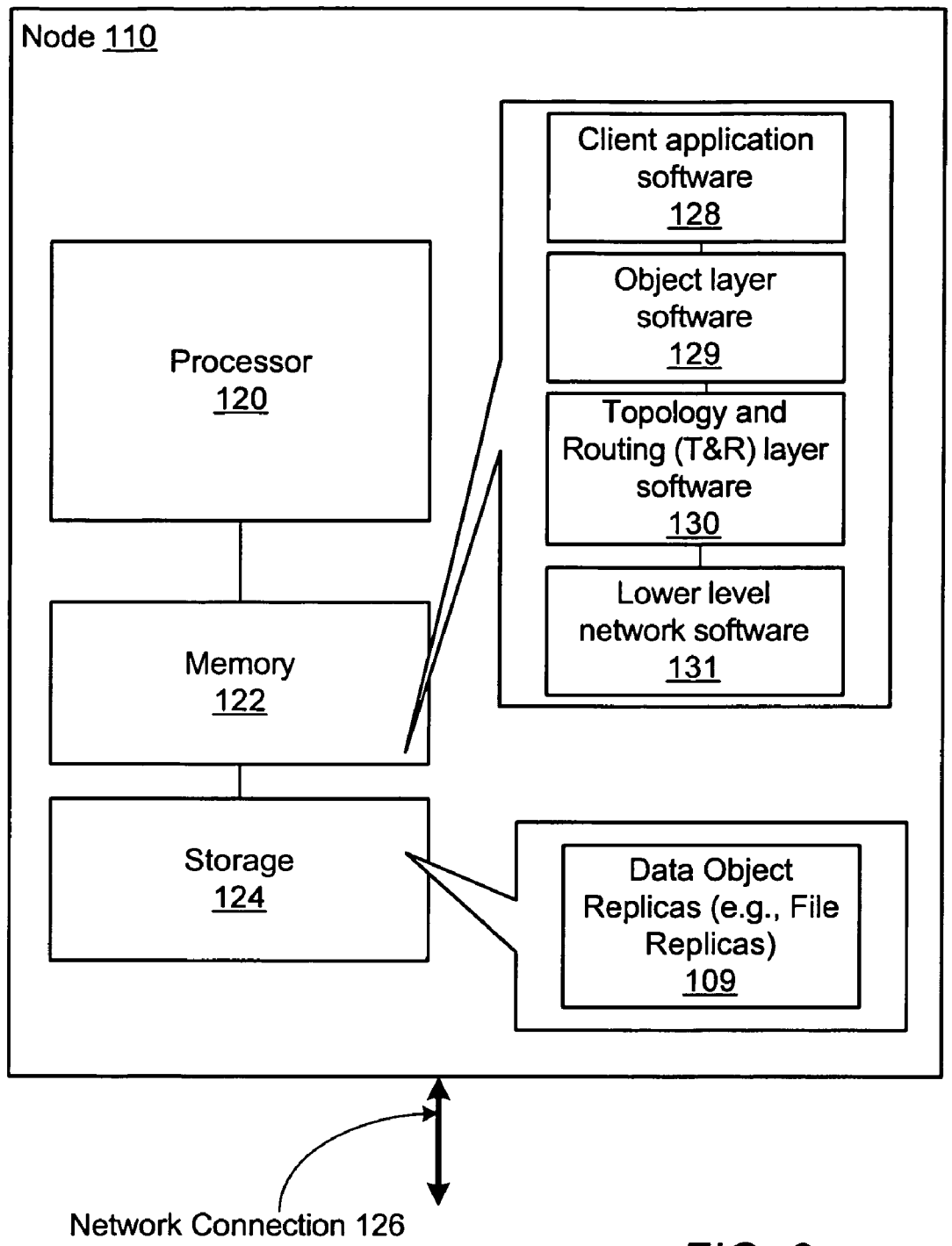
FIG. 2 illustrates one embodiment of a node in the system.

Referring now to FIG. 2, a diagram of one embodiment of a node 110 in the system 100 is illustrated. Generally speaking, a node 110 may include any of various hardware and software components. In the illustrated embodiment, the node 110 includes a processor 120 coupled to a memory 122, which is in turn coupled to a storage device 124. The node 110 may also include a network connection 126 through which the node 110 couples to the network 102. The network connection 126 may include any type of hardware for coupling the node 110 to the network 102, e.g., depending on the type of node 110 and type of network 102.

The processor 120 may be configured to execute instructions and to operate on data stored within the memory 122. In one embodiment, the processor 120 may operate in conjunction with the memory 122 in a paged mode, such that frequently used pages of memory may be paged in and out of the memory 122 from the storage 124 according to conventional techniques. It is noted that the processor 120 is representative of any type of processor. For example, in one embodiment, the processor 120 may be compatible with the x86 architecture, while in another embodiment the processor 120 may be compatible with the SPARC™ family of processors. Also, in one embodiment the node 110 may include multiple processors 120.

The memory 122 may be configured to store instructions and/or data. In one embodiment, the memory 122 may include one or more forms of random access memory (RAM) such as dynamic RAM (DRAM) or synchronous DRAM (SDRAM). However, in other embodiments, the memory 122 may include any other type of memory instead or in addition.

The storage 124 may be configured to store instructions and/or data, e.g., may be configured to store instructions and/or data in a stable or non-volatile manner. In one embodiment, the storage 124 may include non-volatile memory, such as magnetic media, e.g., one or more hard drives, or optical storage. In one embodiment, the storage 124 may include a mass storage device or system. For example, in one embodiment, the storage 124 may be implemented as one or more hard disks configured independently or as a disk storage system. In one embodiment, the disk storage system may be an example of a redundant array of inexpensive disks (RAID) system. In an alternative embodiment, the disk storage system may be a disk array, or Just a Bunch Of Disks (JBOD), (used to refer to disks that are not configured according to RAID). In yet other embodiments, the storage 124 may include tape drives, optical storage devices or RAM disks, for example.

FIG. 2 illustrates an exemplary embodiment in which the node 110 participates with other nodes to implement a distributed file sharing system. As shown, in one embodiment the storage 124 may store one or more data object replicas 109. In various embodiments, replicas of any kind of data object may be utilized in the system 100. For example, in one embodiment a data object may comprise a file. Thus, the data object replicas 109 may comprise replicas of files. In general, a data object may comprise data or information of any kind, where the data is organized or structured in any way. In various embodiments, the data object replicas 109 may be utilized within the system 100 in any application or to perform any function. Any number of replicas 109 may be stored in the storage 124 of a given node 110.

In one embodiment, each data object may have an identifier (ID). In one embodiment, multiple replicas 109 of the same data object may be referenced using the ID of the corresponding data object. The ID of a data object may comprise any kind of information usable to identify the data object. In one embodiment, a data object ID may comprise a 128-bit Universally Unique ID (UUID).

Various data objects may be replicated on different nodes 110. In other words, for a given data object, multiple nodes may have replicas 109 of the data object. As used herein, the term replica refers to an entity, e.g., a data structure or software construction, that represents a data object. Each replica 109 of a data object may include at least a portion of the data for the data object. (In one embodiment, a replica 109 may also be an empty replica that does not include any of the data object's data.) As described below, at any given time, multiple replicas 109 of a given data object may be in various states of coherency or synchronization with respect to each other. Exemplary techniques for maintaining coherency among data object replicas 109 are discussed below.

Replicating data objects across multiple nodes 110 in the system 100 may enable the nodes 110 to share data objects in a distributed manner, e.g., the nodes 110 may store files in a distributed manner. A given replica 109 on a given node 110 may be stored as any of various types of replicas. Exemplary types of replicas are described in detail below.

In one embodiment, the memory 122 may store lower level network software 131. The lower level network software 131 (also referred to as link layer software) may be executable by the processor 120 to interact with or control the network connection 126, e.g., to send and receive data via the network connection 126. The lower level network software 131 may also be responsible for discovering other nodes 110 or establishing communication links from the node 110 to other nodes 110. The memory 122 may also store topology and routing (T&R) layer software 130 that utilizes the lower level network software 131. The memory 122 may also store object layer software 129 that utilizes the T&R layer software 130 and client application software 128 that utilizes the object layer software 129 and the T&R layer software 130.

In one embodiment, the T&R layer software 130 may be executable by the processor 120 to create and manage data structures allowing client application software 128 and/or object layer software 129 to communicate with other nodes 110 in the system 100, e.g., to communicate with other client application software 128 or object layer software 129 executing on other nodes 110. In one embodiment, the T&R layer software 130 may be utilized to send messages to other nodes 110 via links established by the link layer software. Similarly, the T&R layer software 130 may pass messages received from other nodes 110 to the client application software 128 or object layer software 129, e.g., messages which originate from client application software 128 or object layer software 129 executing on other nodes 110. The T&R layer software 130 may also be involved in forwarding messages routed through the local node 110, where the messages originate from another node 110 and are addressed to another node 110 in the system 100.

The object layer software 129 may be operable to create and manage replicas 109. Replica management functions performed by the object layer software 129 according to one embodiment are described in detail below. The object layer software 129 may utilize the T&R layer software 130 to communicate with other nodes 110 to manage the replicas 109.

Figure 3:
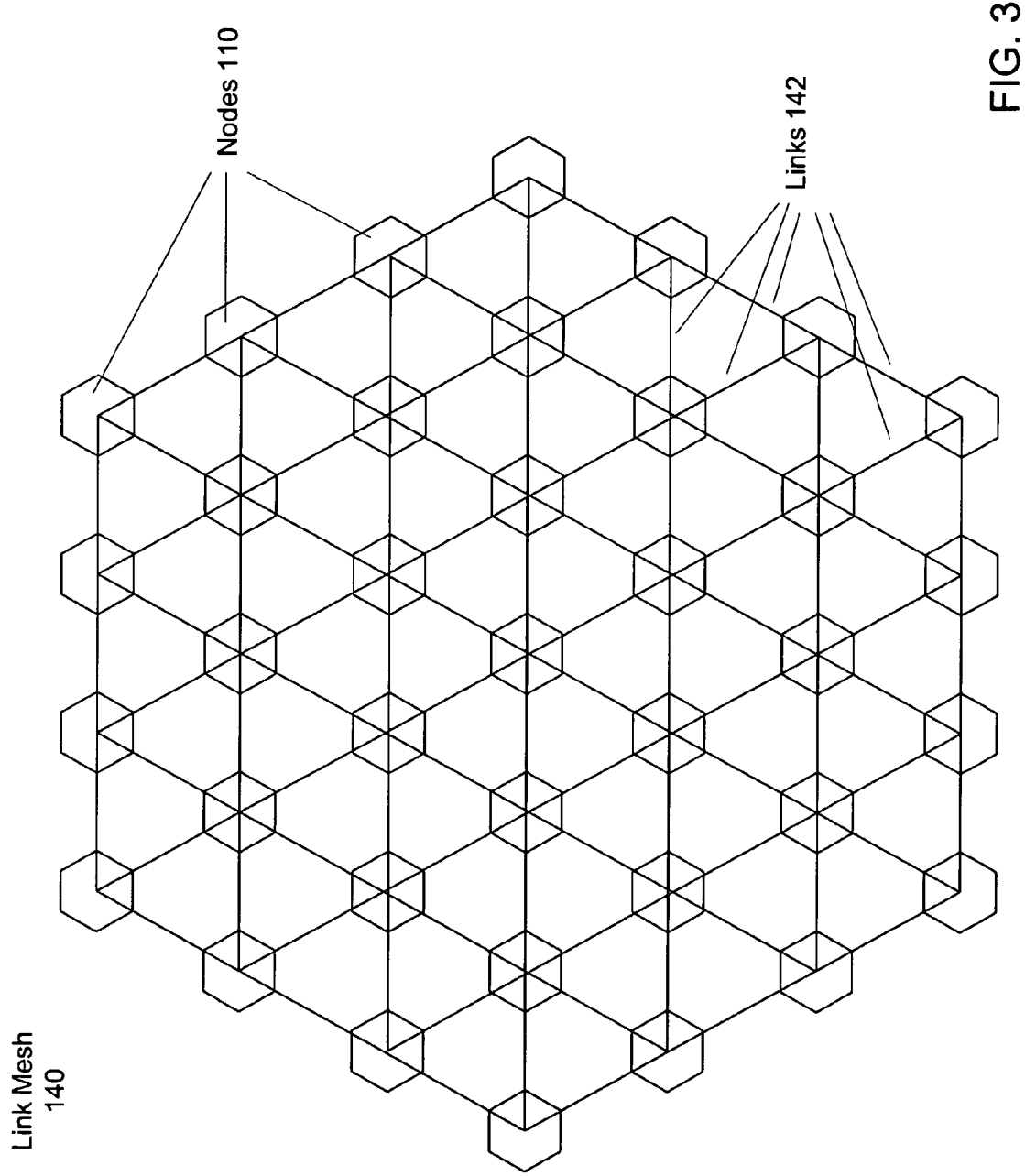
FIG. 3 illustrates a link mesh utilized by the system according to one embodiment.

FIG. 3 illustrates a link mesh 140 utilized by the system 100 according to one embodiment. In this embodiment, as each node 110 joins the system 100, the node 110 may establish links 142 with at least a subset of other nodes 110 in the system 100. As used herein, a link 142 may comprise a virtual communication channel or connection between two nodes 110. Thus, the links 142 are also referred to herein as virtual links 142. Each link 142 may be bi-directional so that each of the two nodes connected by the link 142 can use the link 142 to communicate with the other node.

In one embodiment, the lower level network software 131 executing on a given node 110 may be responsible for performing a node discovery process and creating links 142 with other nodes 110 as the node 110 comes online in the system 100. For example, in one embodiment, the lower level network software 131 may include a link layer that invokes a node discovery layer and then builds virtual node-to-node communication channels or links 142 to one or more of the discovered nodes 110. The nodes 110 with which a given node 110 establishes links are also referred to herein as neighbor nodes, or simply neighbors.

The resulting set of connected nodes 110 is referred to herein as a link mesh 140. In FIG. 3, each hexagon represents a node 110, and each line represents a link 142 between two nodes 110. It is noted that FIG. 3 is exemplary only, and in various embodiments, any number of nodes 110 may be connected by the link mesh 140, and each node 110 may establish links 142 to any number of neighbor nodes 110.

The nodes 110 interconnected by virtual links 142 may effectively comprise an overlay network in which nodes communicate by routing messages to each other over the established links 142. In various embodiments, each virtual link 142 may be implemented using any of various networking methodologies or protocols. For example, in one embodiment, each virtual link 142 may be implemented using a network protocol such as TCP or UDP. Although a virtual link 142 may directly connect two nodes 110 with respect to the overlay network, the virtual link 142 may be implemented as a network connection that passes through one or more intermediate devices or computer systems. For example, a virtual link 142 may be implemented as a network connection that passes through one or more devices such as routers, hubs, etc. However, when a first node 110 establishes a virtual link 142 to a second node 110, the first node 110 may pass messages to the second node 110 (and vice versa) via the virtual link 142 without the message being seen as a message on the overlay network by any intermediate nodes 110.

In one embodiment, nodes 110 in the system 100 may be organized or divided into multiple realms. As used herein, a realm refers to a group of nodes 110 that communicate with each other in a low-latency, reliable manner and/or physically reside in the same geographic region. In one embodiment, each realm may comprise a local area network (LAN). In another embodiment, a single LAN may comprise multiple realms.

As used herein, a LAN may include a network that connects nodes within a geographically limited area. For example, one embodiment of a LAN may connect nodes within a 1 km radius. LANs are often used to connect nodes within a building or within adjacent buildings. Because of the limited geographic area of a LAN, network signal protocols that permit fast data transfer rates may be utilized. Thus, communication among nodes 110 within a LAN (or within a realm) may be relatively efficient. An exemplary LAN may include an Ethernet network, Fiber Distributed Data Interface (FDDI) network, token ring network, etc. A LAN may also connect one or more nodes via wireless connections, such as wireless Ethernet or other types of wireless connections.

In one embodiment, each realm or LAN may have an identifier (ID). The ID of a realm may comprise any kind of information usable to identify the realm, such as numeric or textual information. In one embodiment, a realm ID may comprise a 128-bit Universally Unique ID (UUID).

For any given node 110 in a given realm, links 142 may be established from the node 110 to other nodes 110 in the same realm and/or to nodes 110 in other realms (remote realms). The term "near neighbors" may be used to refer to nodes 110 to which the given node 110 is connected in the same realm. The term "remote neighbors" may be used to refer to nodes 110 to which the given node 110 is connected in other realms. As various messages are sent from a given node 110 in a given realm to other nodes 110, the messages may be sent to near neighbors and/or remote neighbors. In one embodiment, send operations may be restricted to the local realm where possible. This may be useful, for example, to avoid the overhead of a wide area network (WAN) transfer. In one embodiment, an application programming interface (API) for sending a message may allow the sender to specify whether or how to restrict the send operation in this manner.

Figure 4:
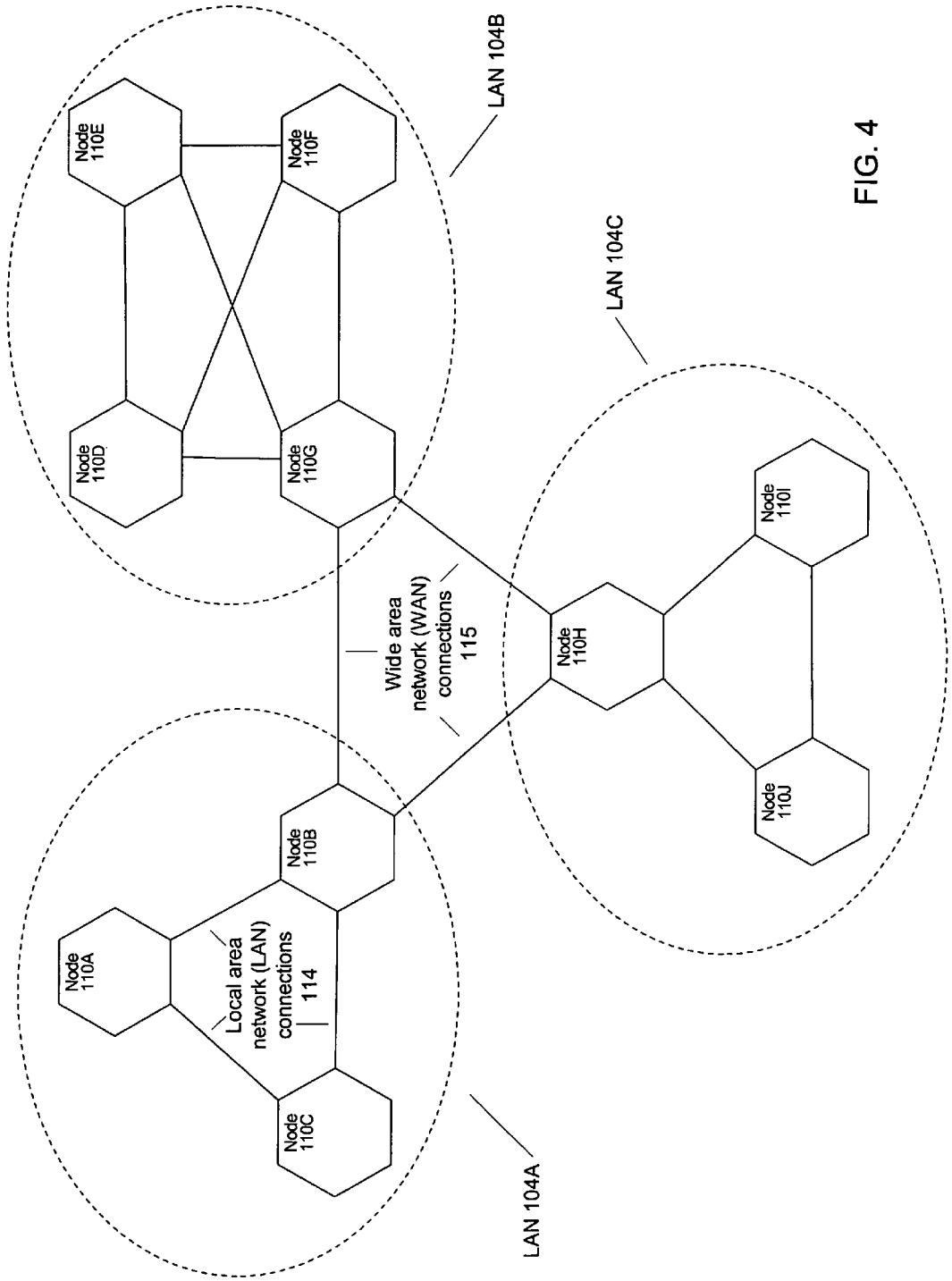
FIG. 4 illustrates one embodiment of the system organized into three local area networks (LANs)

FIG. 4 illustrates one embodiment of a system 100 organized into three LANs 104. In one embodiment, each LAN 104 may comprise a separate realm. LAN 104A includes nodes 110A-110C; LAN 104B includes nodes 110D-110G; and LAN 104C includes nodes 110H-110J. Each line connecting two nodes 110 within a LAN 104 may represent a LAN connection 114, e.g., an Ethernet connection, FDDI connection, token ring connection, or other connection, depending on the type of LAN utilized.

As used herein, a "wide area network (WAN) connection" may comprise a network connection between two nodes in different realms or LANs 104. As shown in FIG. 4, WAN connections 115 may be utilized to interconnect the various realms, e.g., LANs 104, within the system 100. A WAN connection may allow two nodes 110 that are separated by a relatively long distance to communicate with each other. For example, in one embodiment a WAN connection 115 may connect two nodes 110 that are separated by 1 km or more. (WAN connections 115 may also be used to interconnect two nodes 110 in different realms or LANs, where the two nodes 110 are separated by a distance of less than 1 km.) In one embodiment, the data transfer rate via a WAN connection 115 may be relatively slower than the data transfer rate via a LAN connection 114. In various embodiments, a WAN connection 115 may be implemented in various ways. A typical WAN connection may be implemented using bridges, routers, telephony equipment, or other devices.

It is noted that FIG. 4 illustrates a simple exemplary system 100. In various embodiments, the system 100 may include any number of realms or LANs 104, and each realm or LAN 104 may include any number of nodes 110. Also, although FIG. 4 illustrates an example in which a single node from each realm is connected to a single node of each of the other realms, in various embodiments, various numbers of WAN connections 115 may be utilized to interconnect two realms or LANs. For example, a first node in a first realm may be connected to both a second node and a third node in a second realm. As another example, a first node in a first realm may be connected to a second node in a second realm, as well as a third node in the first realm being connected to a fourth node in the second realm.

Figure 5:
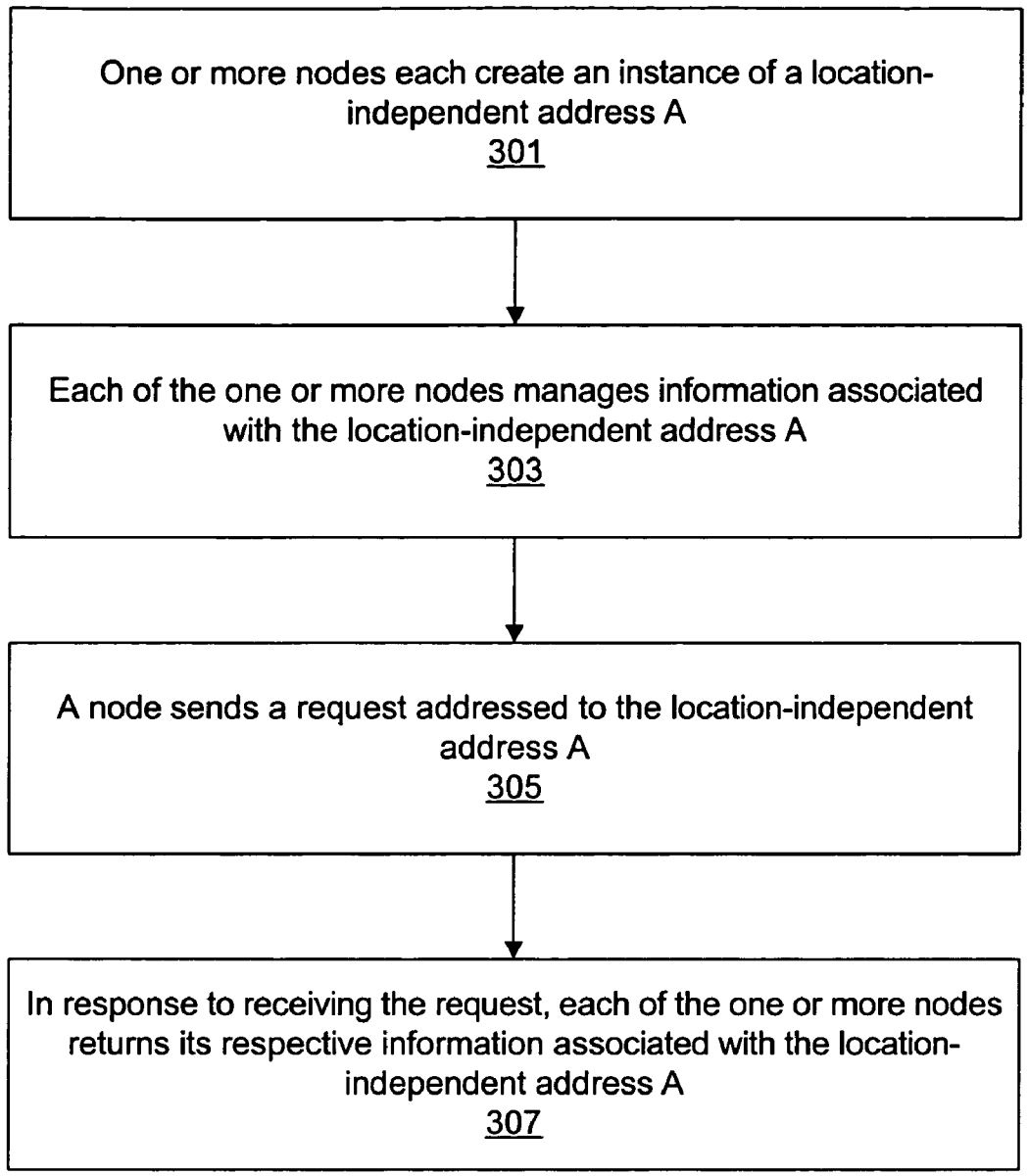
FIG. 5 is a flowchart diagram illustrating one embodiment of a method enabling nodes in the system to obtain statistical information from other nodes.

FIG. 5—Method for Obtaining Statistical Information

FIG. 5 is a flowchart diagram illustrating one embodiment of a method enabling nodes 110 in a system 100 comprising a plurality of nodes 110 to obtain information, e.g., statistical information, from other nodes 110. It is noted that FIG. 5 illustrates a representative embodiment, and alternative embodiments are contemplated. Also, various elements may be combined, omitted, or performed in different orders.

In 301, one or more nodes may each create an instance of a location-independent address A. As described below, the location-independent address A may represent an address for sending request messages (also referred to simply as requests) in order to obtain information or data from the one or more nodes with which the location-independent address A is associated (i.e., from the one or more nodes that create instances of the location-independent address A).

As used herein, a "location-independent address" may comprise an address to which a message may be sent without directly specifying where the message recipient(s) is located in the network, e.g., without directly specifying a particular node in the network. Using location-independent addresses allows messages to be sent from a sender node to one or more destination nodes without the sender node being required to know which specific nodes the location-independent address is associated with or without knowing which specific nodes are the destination nodes. Thus, a sender node may send a message to each of the one or more nodes that create instances of the location-independent address A by simply specifying the location-independent address A as the destination for the message. The location-independent address A may not directly specify that the one or more nodes that created instances of the location-independent address A are the message recipients.

In one embodiment, the location-independent address A may simply comprise a name, e.g., a string. For example, in one embodiment, the location-independent address A may comprise a "role", and a message may be sent to the location-independent address A by simply addressing the message to the name of the role. An exemplary embodiment of a system that utilizes roles to send messages is described below.

Nodes in the network may possess routing information enabling them to route the message toward the one or more nodes with which the location-independent address A is associated (i.e., route the message to the one or more nodes that created instances of the location-independent address A). For example, as each of the one or more nodes creates an instance of the location-independent address A in 301, nodes in the system may communicate to perform a route-building process to update routing information stored by nodes in the system so that the nodes are operable to appropriately route messages addressed to the location-independent address A.

In various embodiments, a location-independent address may be utilized for sending messages for any purpose. As noted above, in one embodiment, the location-independent address A may represent an address for sending request messages (also referred to simply as requests) in order to obtain information or data from the one or more nodes with which the location-independent address A is associated. As described below, in response to receiving a request addressed to the location-independent address A, each of the one or more nodes that created an instance of the location-independent address A in 301 may be configured to return information to the sender of the request. Thus, as shown in 303, each of the one or more nodes that created an instance of the location-independent address A may manage information associated with the location-independent address A, i.e., the information that is returned in response to requests addressed to the location-independent address A.

In various embodiments, the one or more nodes with which the location-independent address A is associated may manage any kind of information or data to return in response to requests sent to the location-independent address A. In one embodiment the information may comprise statistical information. For example, in one embodiment the statistical information may comprise information regarding resources or properties of the nodes. In another embodiment the statistical information may comprise statistical information regarding a function performed by nodes in the system. For example, where the nodes in the system implement a distributed file sharing system, the statistical information may comprise file access statistics or file cache access statistics.

In 303, managing information may comprise each node storing information so that it is available to return in response to requests received by the node. Also, each of the one or more nodes may update its respective information as appropriate. For example, where the information comprises information regarding node resources, each node may update the information as resource usage on the node changes. As another example, where the information comprises information regarding file access statistics, each node may update the information as file accesses monitored by the node occur.

As indicated in 305, the method may further comprise a node sending a request addressed to the location-independent address A. The request may comprise a request to obtain the information associated with the location-independent address A, i.e., the information managed by each of the one or more nodes that created instances of the location-independent address A.

As described above, when the node sends the request addressed to the location-independent address A, nodes in the system may be operable to route the request so that the request arrives at each of the one or more nodes that created instances of the location-independent address A. In response to receiving the request, each of the one or more nodes may return its respective information that the node manages in association with the location-independent address A, as shown in 307. For example, each of the one or more nodes may return a reply message that includes the information, and the reply message may be routed back to the node that sent the request message in 305.

The above-described method may be employed to enable nodes 110 in a system 100 to obtain statistical (or other) information of various kinds from other nodes 110 in the system. Any number of location-independent addresses may be established in association with various kinds of information. For example, in addition to the location-independent address A, another location-independent address B may be established by one or more nodes, where the location-independent address B represents an address for sending messages to obtain a different kind of information. Instances of the location-independent address B may be created by the same nodes that created instances of the location-independent address A, by other nodes, or by a combination of the same nodes and other nodes.

In one embodiment, location-independent addresses may dynamically change as the system operates. For example, a node that previously created an instance of the location-independent address A may subsequently remove its instance so that messages addressed to the location-independent address A are no longer sent to the node. Similarly, at any time a new node may create an instance of the location-independent address A so that future messages addressed to the location-independent address A are also sent to the new node. Thus, instances of various location-independent addresses may be created and deleted by various nodes as appropriate, e.g., depending on the semantics associated with the location-independent addresses or the nature of the information associated with the location-independent addresses.

In another embodiment, the fact that a node has created an instance of a particular location-independent address may in and of itself provide requester nodes with statistical information regarding the node. As an illustrative example, consider a plurality of nodes that implements a distributed file system. Decisions regarding where to store files may be made based on node resource statistics, such as the amount of available free space on each node. In one embodiment a location-independent address may be used to select a node on which to store a new file or file cache. For example, each node that has an amount of free space above some threshold level may create an instance of a location-independent address B. If the free space on a node later falls below the threshold level, the node may remove its instance of the location-independent address B.

A requester node that wants to locate a candidate node for storing a new file may send a message to the location-independent address B. Each of the nodes that has created an instance of the location-independent address B may respond to the message by returning information identifying that node, e.g., may return its own node ID. The requester node may then select one of the nodes that responded to the message and may communicate directly with the selected node to store the file, e.g., may communicate directly with the selected node using the node ID of the selected node.

A variation of this technique is possible, where instead of a single location-independent address to represent nodes having a resource usage above or below a threshold level, a set of multiple location-independent addresses are used to represent different categories of resource usage. In the previous example, instead of having a single location-independent address B to represent nodes whose free space is above a threshold level, there may be location-independent addresses B1, B2, ... BN. For example, there may be location-independent addresses B1, B2, B3, and B4, where location-independent address B1 represents nodes whose disk space usage is 0% to 24%, B2 represents nodes whose disk space usage is 25% to 49%, B3 represents nodes whose disk space usage is 50% to 74%, and B4 represents nodes whose disk space usage is 75% to 100%. Thus, as the disk space usage on each node fluctuates, the node may create and remove instances of these location-independent addresses accordingly.

Figure 6:
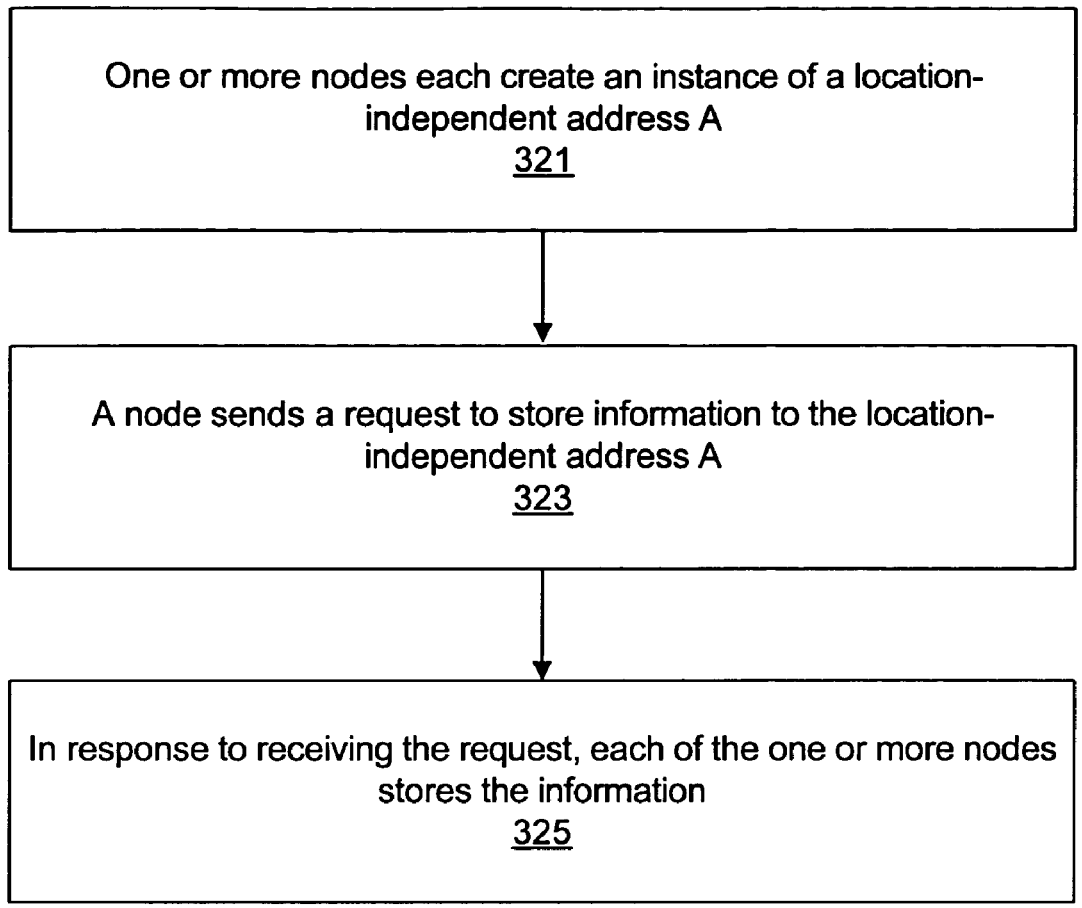
FIG. 6 is a flowchart diagram illustrating one embodiment of a method enabling nodes in the system to store statistical information on other nodes.

FIG. 6—Method for Storing Statistical Information

FIG. 6 is a flowchart diagram illustrating one embodiment of a method enabling nodes 110 in a system 100 comprising a plurality of nodes 110 to store information, e.g., statistical information, on other nodes 110. It is noted that FIG. 6 illustrates a representative embodiment, and alternative embodiments are contemplated. Also, various elements may be combined, omitted, or performed in different orders.

In 321, one or more nodes may each create an instance of a location-independent address A, similarly as for 301 of FIG. 5. However, instead of representing an address for sending requests to obtain information or data, in this case the location-independent address A may represent an address for sending requests to store information or data.

In various embodiments, the location-independent address A may represent an address for sending requests to store information of any kind. In one embodiment the information may comprise statistical information. For example, in one embodiment the statistical information may comprise information regarding resources or properties of the sender node. In another embodiment the statistical information may comprise statistical information regarding a function performed by nodes in the system. For example, where the nodes in the system implement a distributed file sharing system, the statistical information may comprise information regarding file access statistics.

In 323, a node may send a request to store information to the location-independent address A. Thus, each of the one or more nodes that created an instance of the location-independent address may receive the request, as described above. The request message may include the information to be stored, e.g., statistical information to be stored.

In 325, each of the one or more nodes may store the information sent in the request message.

The method of FIG. 6 may be employed to enable nodes 110 in a system 100 to store statistical (or other) information of various kinds on other nodes 110 in the system. Any number of nodes may create an instance of the location-independent address A. Having multiple nodes available to store information sent to the location-independent address A may be desirable, for example, for high availability in the presence of node or network failures. If desirable, multiple location-independent addresses may be established in association with multiple kinds of information or statistics. For example, in addition to the location-independent address A, another location-independent address B may be established by one or more nodes, where the location-independent address B represents an address for sending messages to store a different kind of information. Instances of various location-independent addresses may be created and deleted by various nodes as appropriate for a particular application.

As one example to illustrate the application of the method of FIG. 6 to solve a particular problem, consider an embodiment in which the plurality of nodes are segmented into multiple realms as described above and implement a distributed file sharing system in which files or data objects can be cached in multiple realms. In one embodiment, the method of FIG. 6 may be employed to store statistical information that is used to decide when to create a local cache of a file in a particular realm. For example, consider a realm R in which no node in the realm currently stores a cached version of a file F. Thus, read requests by nodes in the realm R may need to be satisfied by a node in a remote realm that has a cached version of the file F. The method of FIG. 6 may be utilized to store statistical information regarding read requests originating from nodes in the realm R. For example, read request statistics may be tracked so that a local cached version of the file F can be created on a node in the realm R if read request activity by nodes in the realm R rises above a threshold level. (Creating a local cached version of the file F in the realm R may allow nodes in the realm R to read data from the file F more efficiently, i.e., because communication with nodes outside the realm R is not required.)

According to one embodiment, requests by nodes within the realm R to read data from the file F may be sent to a location-independent address A. The location-independent address A may be associated with a node N in the realm R and may represent an address for monitoring read requests for the file F. In response to receiving a read request, node N may store or update information to indicate that the read request was received. Node N may then forward the read request to another node M in a remote realm, where the node M has a cached version of the file F. Node M may then satisfy the read request by returning the requested data from file F to the node in realm R that requested the data. Thus, read requests for the file F are effectively filtered through the node N which tracks statistical information regarding the read requests and can initiate the creation of a local cache of the file F on a node in the realm R if appropriate, based on the statistical information.

One particular embodiment of a system operable to monitor read requests in local realms in this manner is described in detail below. In the described embodiment, the location-independent address to which read requests are sent in a local realm that does not have a cached version of a file is referred to as an "S-role".

In one embodiment the method of FIG. 6 may be combined with the method of FIG. 5. For example, a node A may create an instance of a location-independent address A, and a node B may send a message to the location-independent address A requesting information to be stored. In response, node A may store the information sent by node B. A node C may then send a message to the location-independent address A requesting to obtain the information. In response, node A may return the requested information to node C.

In one embodiment, location-independent addresses may represent addresses within a single realm or LAN for obtaining or storing information. For example, as described above, in one embodiment read requests originating from a particular realm or LAN may be filtered through a location-independent address associated with a node within the realm or LAN. As another example, consider a location-independent address that represents an address for obtaining information regarding node resource usage. In some cases it may be desirable to obtain information regarding node resource usage by nodes in the local realm or LAN only. The system may be operable to perform an efficient send operation to restrict the sending of a message to the local realm or LAN. Thus, one or more nodes within the local realm or LAN may receive the message and respond by returning information regarding their resource usage, but the message may not be sent to nodes in other realms or LANs.

Figure 7:
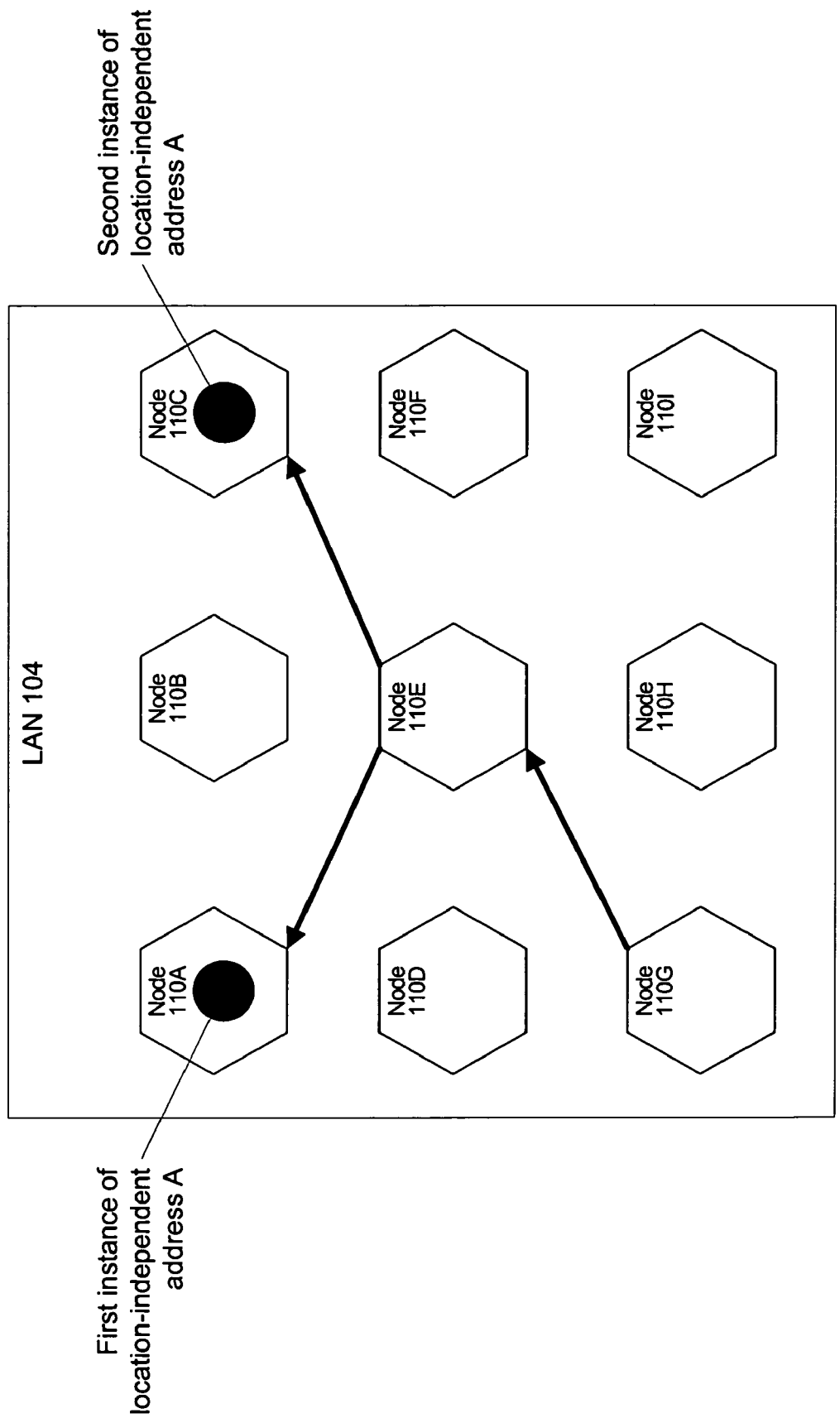
FIG. 7 illustrates a single LAN in which multiple nodes in the LAN have each created an instance of a location-independent address.

For example, FIG. 7 illustrates a LAN 104 including nodes 110A-110I. Nodes 110A and 110C have both created an instance of a location-independent address A. The arrows illustrate the routing of a message sent from node 110G to the location-independent address A. As shown, nodes 110A and 110C each receive the message and may respond by returning information, as described above.

In another embodiment, location-independent addresses may be utilized on a global scale so that messages sent to a location-independent address cross realm or LAN boundaries. For example, in some cases it may be desirable to obtain information regarding node resource usage by nodes throughout the system. Thus, a send operation may be utilized to send a request message addressed to the location-independent address to nodes in the local realm or LAN as well as nodes in remote realms or LANs.

Figure 8:
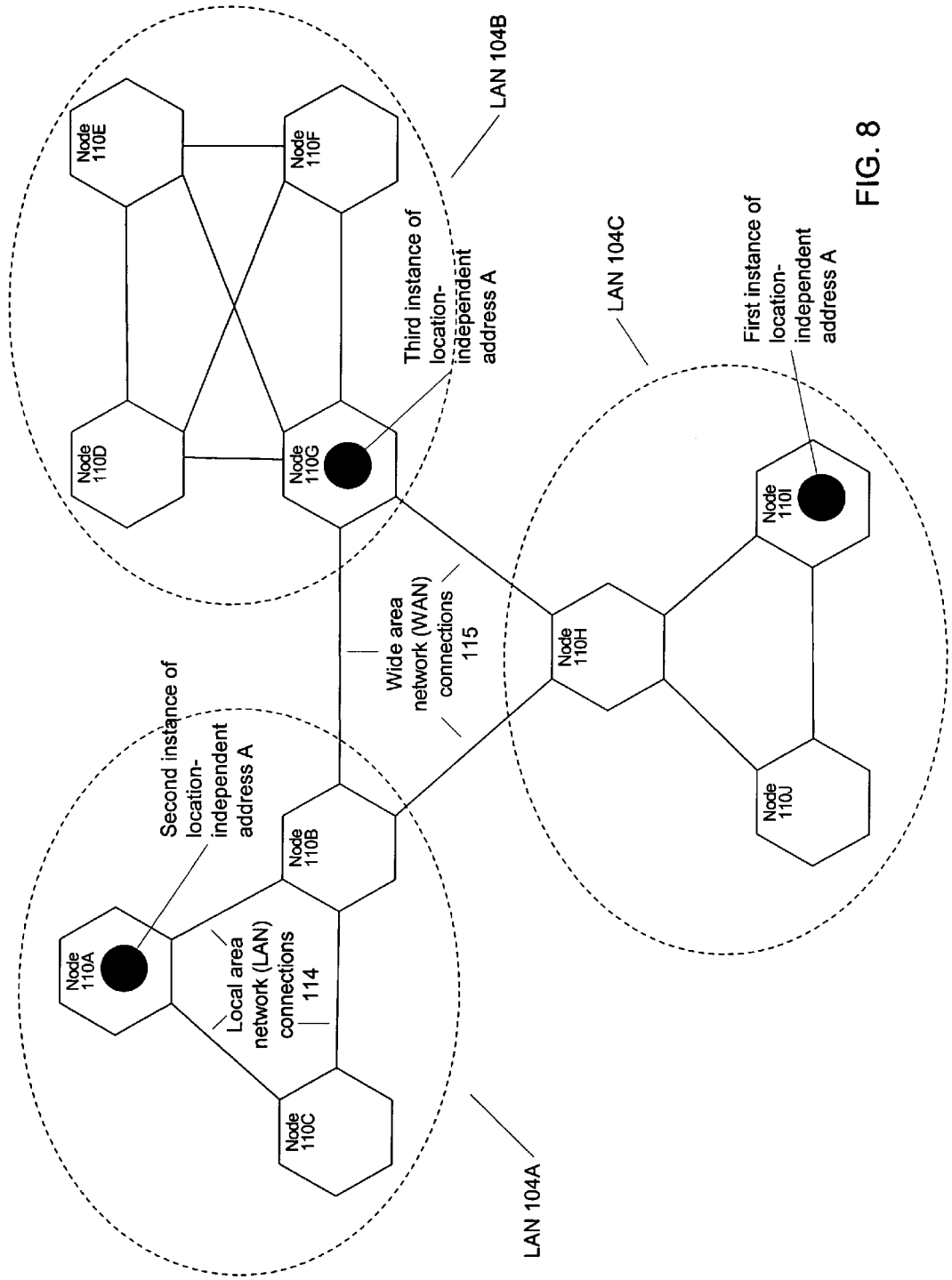
FIG. 8 illustrates a system including a plurality of LANs in which nodes in multiple LANs have each created an instance of a location-independent address.

For example, FIG. 8 illustrates LANs 104A-104c. Node 110I in LAN 104C has created a first instance of a location-independent address A, Node 110A in LAN 104CA has created a second instance of the location-independent address A, and Node 110G in LAN 104B has created a third instance of the location-independent address A. Thus, a message addressed to the location-independent address A may be sent to each of the nodes 110I, 110A, and 110G in the multiple LANs 104.

As described above, in one embodiment the method of FIG. 6 may be utilized in a system 100 that implements distributed file sharing, e.g., may be utilized to store information regarding read access statistics for a file, where the information is used to decide when to create a local cached version of the file. The remainder of this disclosure describes one particular embodiment of a system 100 that implements distributed file sharing and utilizes the method of FIG. 6 in this manner. However, it is noted that the described embodiment of the system 100 is intended to be exemplary only, and the methods of FIGS. 5 and 6 may be utilized to obtain and/or store information for any purpose and in systems that perform any of various applications.

As described above with reference to FIG. 2, in one embodiment a file (or other type of data object) on any given node may be stored on the node as a replica of the file (or data object). In one embodiment, each node that creates a replica of a file or data object may create a location-independent address associated with the replica, where the location-independent address represents the replica. A location-independent address that represents the replicas of a data object on one or more nodes may allow other nodes to send messages to the particular nodes that have the replicas without knowing which nodes those are. For example, a first node may send a message to one or more other nodes, where the one or more other nodes have replicas of the data object, and where the first node does not know that the particular nodes that have replicas of the data object are the one or more other nodes. The first node may simply address the message to the location-independent address that represents the replicas of the data object.

In one embodiment, the location-independent addresses that represent replicas may comprise roles. Role-based message addressing is described below. In one embodiment, types of replicas for a data object may vary, and each type of replica may be represented by a different role. As described below, in one embodiment the type of replica for a given data object on a given node may change over time. Thus, the role representing the replica may be replaced with a different type of role when such a change occurs. In one embodiment, four types of roles may be utilized. A glossary including brief descriptions of the four types of roles and related concepts follows. A more detailed description of the use of these roles to maintain coherency for data object replicas (and more details) follows the glossary. Terms in the glossary are also further explained in this more detailed description.

GLOSSARY

P-role—This role indicates a primary and persistent replica. This is also a conflict-resolver role. A replica that has asserted the P-role is called a P-replica. P-replicas may also be in charge of detecting all conflicts caused by updates to different W-replicas (described below) in different realms. In one embodiment a replica cannot assert the P-role unless it already has the W-role. To ensure that the P-role does not become a single point of failure, a realm may be required to have N(P) nodes that assert the P-role. In one embodiment, each of the N(P) nodes may assert the P-role simultaneously. In one embodiment, a replica that asserts the P-role cannot be deleted to re-claim space.

N(P)—This is the number of replicas of an object that the system must maintain in a realm in order to be able to assert the P-role in that realm. If the number of P-replicas falls below a quorum of N(P) (e.g., due to temporary node failures), then all conflict detection/resolution activity for this object in the entire system may be suspended until a quorum can be established again. No replica updates may be propagated outside the local realm (i.e., the realm where the updates were applied) until a quorum of P-replicas is re-established. If the number of P-replicas falls below N(P) due to a permanent failure, the system may detect this and create a new P-replica in that realm.

W-role—This role is asserted by a replica of an object if the replica is an updateable replica, i.e., a replica that can receive and apply data updates. A replica that has asserted the W-role is called a W-replica. In one embodiment, the presence of a W-replica of an object in a realm allows that object to be updated locally without requiring any inter-realm messages before returning success to the client application software. In one embodiment, the W-role can only be asserted by a node in a given realm if there are N(W) nodes in the realm that have instances of the W-role. The system may guarantee that updates made to a W-replica are made persistent on at least a quorum of the N(W) instances before returning success to the client application software. A W-role does not necessarily indicate persistency. A W-role can be removed if all the corresponding updates have been accepted by the P-replicas and made permanent. Removal of a W-role will normally involve removal of all the W-roles in that realm. In one embodiment, the W-role subsumes the R-role. In other words, an object that asserts the W-role also asserts the R-role.

N(W)—This is the number of replicas of an object that the system must maintain in a realm in order to be able to assert the W-role in that realm. In one embodiment, if the number of W-replicas falls below a quorum of N(W) (e.g., due to temporary node failures), then the object cannot be updated in this realm. If the number of W-replicas falls below N(W) due to a permanent failure, the system may detect this and create a new W-replica in the realm. If it is not possible to create a new W-replica in the realm, all the other W-replicas in this realm may give up their W-role.

R-role—This role is asserted by a replica of an object if the replica is a read-only cached copy of the object. A replica that has asserted the R-role but is not a W-replica is called an R-replica. The presence of an R-role of an object in a realm allows that object to be read locally without requiring an inter-realm message to be sent. However, all update requests received may be forwarded to the nearest W-replica. In one embodiment, a replica having the R-role might lag behind the latest version of the object because the replica receives updates asynchronously from the P-replicas.

P-realm—A P-realm for a given object has the P-replicas of the object. In one embodiment, for any given object or file, there can be just one P-realm for the object. The P-realm performs the same responsibilities as a W-realm (described below), with the added responsibility of detecting and resolving conflicts in updates made in different W-realms in the system. All updates made in any W-realm are sent to the P-realm. Updates (or invalidate messages) may be broadcast from the P-realm to the other realms in the system. It is noted that different objects may have different P-realms. Thus, although there is only a single P-realm for any given object, multiple realms in the system may act as P-realms (for different objects).

W-realm—A W-realm for a given object has W-replicas of the object. This means that both read as well as update requests originating in this realm can be serviced locally (with low latency). The updates may also be sent to the P-replicas, e.g., may be sent asynchronously. If a network partition isolates this W-realm from other realms, replicas in the W-realm may still be read as well as updated locally. However, as long as the P-replicas are not reachable from this W-realm, the updates will not be visible anywhere else in the system. The updates will continue to be visible in this W-realm. There can be more than one W-realm for a given object. Each W-realm may accept updates independently of the other W-realms. The system may automatically detect and resolve conflicts caused by simultaneous updates.

Remote-realm—A remote realm for a given object does not have any replicas of the object at all. All requests for this object, e.g., read requests as well as update requests, may be forwarded to other realms. If a network partition isolates a remote realm from other realms, the object may be inaccessible in the remote realm.

Local updates log—This is a log of recent local updates that is maintained by each W-replica. In one embodiment, the local updates log only contains updates directly made to the W-replica. For example, the local updates log may not contain updates that were forwarded to the W-replica by a P-replica. Log entries from this log may be removed once a P-replica has acknowledged that the corresponding update has been accepted and applied by the P-replica. A non-empty local updates log indicates that there have been local updates at the site of this W-replica that have probably not yet been confirmed by the P-replicas.

Recent updates log—This is a log of recent updates that is maintained by each P-replica. This contains all the recent updates that have been forwarded to the P-replica by a W-replica. An entry from this log can be removed once the P-replica receives a message from the W-replica indicating that the W-replica has removed the corresponding entry from its local updates log.

Log Sequence Number (LSN)—This is a sequence number given to each log entry in a local updates log or a recent updates log.

Confirmed version number—All replicas in the system may have a confirmed version number. The confirmed version number represents the version number of the last confirmed update that was applied to this replica. This version number is incremented by P-replicas when applying an update, and is then broadcast to all the other replicas.

Local version number—A W-replica can have a local version number in addition to the confirmed version number. The local version number is incremented whenever a local update is applied to the W-replica. This represents an update that has not yet been confirmed by the P-replicas. As an optimization, the LSN of the local updates log may be used as the local version number.

Quorum version number—A replica that has a role with quorum semantics is required to have a corresponding quorum version number. Specifically, W-replicas and P-replicas are required to have a quorum version number. In case of permanent failures, when a new replica needs to get created, this quorum version number is updated as described below.

Figure 9:
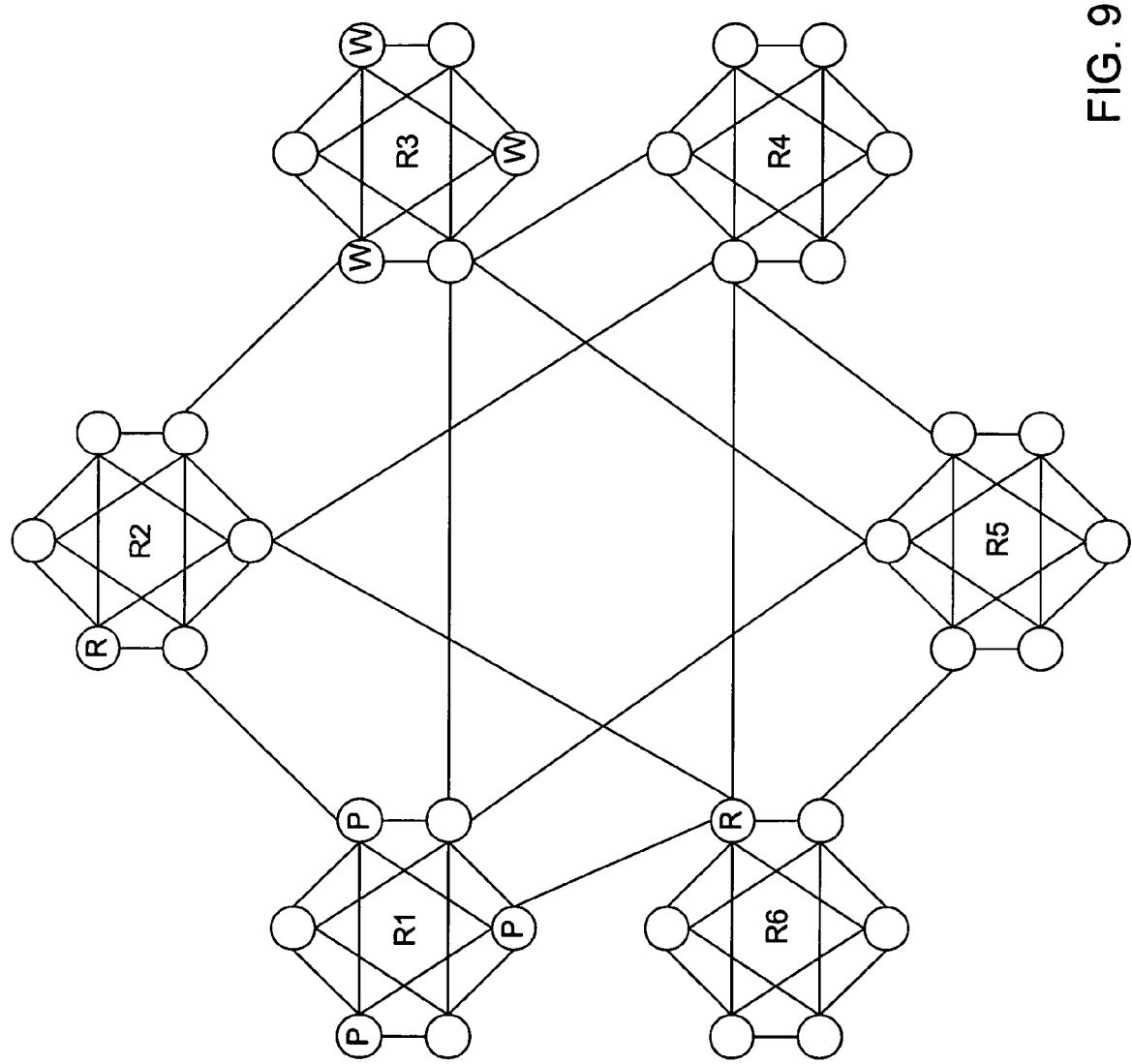
FIG. 9 illustrates an exemplary embodiment of a system in which four types of data object replicas are utilized.

Referring now to FIG. 9, a diagram illustrating an exemplary embodiment of the system 100 is shown. In this embodiment, the system 100 includes six realms, R1-R6. Links between nodes (represented by circles) in each realm are shown as lines connecting the respective nodes. Various inter-realm links are also illustrated.

The system may include a data object or file A. FIG. 9 illustrates several exemplary replicas of the data object or file A. Each node that has a replica is labeled with a corresponding letter indicating the type of replica. A P-replica is labeled with the letter "P", a W-replica is labeled with the letter "W", and an R-replica is labeled with the letter "R". As shown, realm R1 includes three P-replicas (i.e., includes three nodes that have P-replicas of the data object A). Realm R2 includes an R-replica. Realm R3 includes three W-replicas. Realms R4 and R5 are remote realms with respect to the data object A, i.e., do not have any replicas of the data object A. Realm R6 includes an R-replica.

As described above, the W-role indicates that the associated replica is updatable. Multiple realms are allowed to have replicas with the W-role. However each realm that has a W-replica may be required to maintain N(W) W-replicas. For example, in the exemplary system of FIG. 9, N(W) may be 3. In one embodiment, updates can only be performed in a realm that has a W-replica. A quorum of the N(W) replicas present in that realm must be updated synchronously before success is returned to the client application software. Updates initiated by nodes in other realms that do not have a W-replica may be forwarded to the nearest W-realm.

One set of W-replicas (i.e., all the W-replicas in one particular realm), also have the P-role, i.e., this set of W-replicas are also P-replicas. This indicates that these replicas are primary, persistent, and are responsible for detection and resolution of conflicts. Conflicts can occur due to independent updates that are done in different W-realms in the system. As described above, the system may maintain N(P) P-replicas. For example, in the exemplary system of FIG. 9, N(P) may be 3.

After a quorum, e.g., a majority, of W-replicas of a data object has been updated, the update may be asynchronously sent to the P-replicas of the respective object. If there have been no conflicting updates to this object from any other realm in the system, the update may be accepted and may be broadcast to the rest of the realms in the system. If there has been a conflict, e.g., an update independently performed in another realm, the conflict may be resolved, e.g., either by merging the two conflicting updates or rejecting one of the updates. A conflict resolution message may be sent back to the realm that originated the update.

An R-role indicates a read-only cached replica. Read requests received by an R-replica may be satisfied locally, i.e., may not involve any inter-realm message communication. Update requests in a realm that has only R-replicas may be forwarded to the nearest W-replica. In one embodiment, an R-replica is not persistent and can be deleted at any time to re-claim disk space.

In one embodiment, after a successful update to a P-replica, an update packet or message may be broadcast from the P-realm to all R-replicas and W-replicas. In one embodiment, the update message may include all the necessary information to apply the update directly. In another embodiment, the update message may just include meta-data such as offset and length information. In this case, R-replicas can either update themselves immediately by pulling the changed data from the P-realm, or can invalidate themselves by un-publishing the R-role and publishing another role indicating staleness instead. If necessary, W-replicas can also invalidate themselves by un-publishing the W-role and publishing another role to indicate staleness. However, this may be performed transactionally in that W-realm to ensure that all W-replicas reach a collective decision.

In one embodiment, the update message may include all the necessary information to apply the update directly if the update was a small update, i.e., involved only a small data change, and the update message may include just meta-data if the update was a large update.

If a stale replica later synchronizes itself from a P-replica by pulling the latest version of the data, the replica can upgrade itself to an R-replica by un-publishing the role indicating staleness and publishing the R-role.

In one embodiment, updates may be logged using intent logging. Each W-replica and P-replica may maintain some logs of recent updates. These log entries may be used for propagating updates from one replica to another.

Version numbers may be used to detect conflicting updates. If a conflict is detected, the corresponding update log entries may be used to determine the exact updates that are in conflict and to determine how to resolve the conflict. In one embodiment, three different types of version numbers may be used in the system. A confirmed version number may be present in all replicas throughout the system and represents the version number of the last confirmed update that has been applied to that replica. A local version number may be present in the W-replicas and represents local updates that have not yet been confirmed by the P-replicas. Quorum version numbers may also be maintained by W-replicas and P-replicas and are used to create new W- or P-replicas. Details are described in later sections.

Reading and Updating

In one embodiment, any data object in the system can be accessed for read as well as update from any node in the entire system. In the absence of failures such as node failures or network partitions, an access operation may be guaranteed to succeed. In the presence of failures, it is possible that the access might fail.

Figure 10:
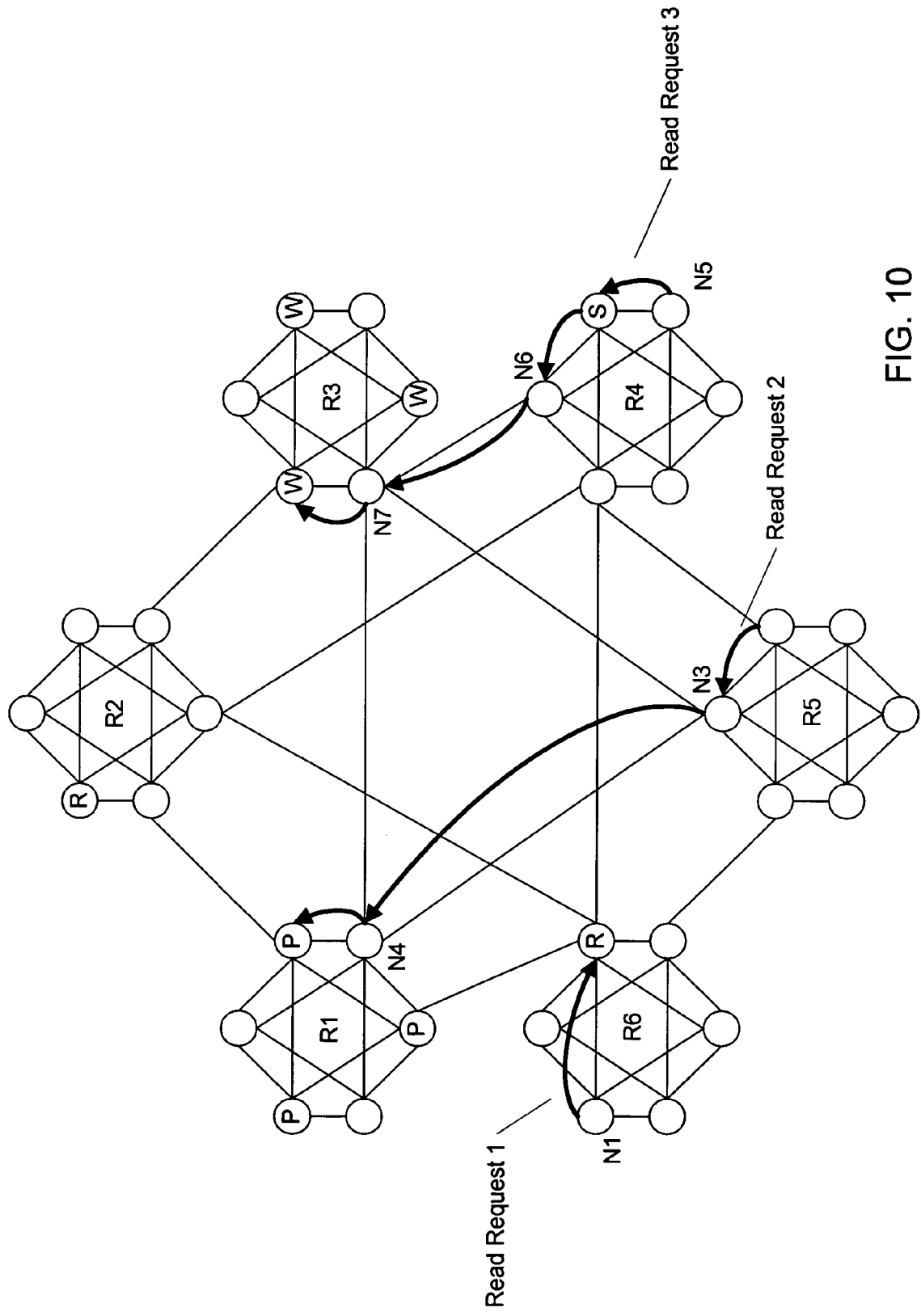
FIG. 10 illustrates a read request operation according to one embodiment.

FIG. 10 illustrates a read request according to one embodiment. A read request on any node may first be forwarded to a single instance of the R-role. For example, the T&R layer software 130 may provide a "sendOneInstance" API call for performing the send. The send may be performed with "nearest" and "LocalRealmOnly" semantics. This will find an R-replica, W-replica or a P-replica (because all of these types of replicas publish the R-role) within the local realm if one is reachable. In one embodiment, if the R-replica has recently forwarded an update to a W-replica but has not yet received a confirmation, the read request may be blocked until confirmation of the write is received, as described below.

In one embodiment, if no R-role is reachable locally, the read request may be forwarded to another type of role within the local realm, referred to as an "S-role". The S-role may accept the request and re-send the message to the R-role, but this time the send operation may be performed with system-wide scope, and the results may be channeled back to the original sender. If a system-wide read request sent from the S-role to the R-role is not able to reach any instance of the R-role, the read request may fail.

The S-role may represent an empty "S-replica" and may keep track of the number of read requests that it has received. In one embodiment, when this number crosses some threshold, the S-replica may convert itself to an R-replica. Thus, channeling remote read requests through a local S-role may be performed in order to collect statistics about the locally originating read requests, similarly as described above with reference to the method of FIG. 6. These statistics may be used to implement heuristics about when an R-replica needs to be created in the local realm.

If no instance of the S-role is found in the local realm (i.e., if an S-replica has not yet been created) then an S-replica may be created locally and then the read request may proceed as described above. The newly created S-replica may be empty, i.e., may not have any data.

FIG. 10 illustrates three exemplary read requests. Read request 1 (indicated as a bold arrow) may be initiated by node N1 in realm R6. As shown, the read request may be sent to the node in realm R6 that has the R-replica, and this R-replica may satisfy the read request.

Read request 2 may be initiated by node N2 in realm R5. As shown, the read request in this example may be propagated from node N2 to node N3 in realm R5, and from node N3 to node N4 in realm R1. (As described above, an empty S-replica may also be created in realm R5, although this operation is not shown.) Node N4 may propagate the read request to a node with a P-replica in realm R1. (As noted above, the P-replicas also have the R-role.) The node with the P-replica may satisfy the read request.

Read request 3 may be initiated by node N5 in realm R4. As shown, the read request in this example may be propagated from node N5 to the node with the S-replica in R4, and from this node to node N6 in realm R4. Node N6 may propagate the read request to node N7 in realm R3. Node N7 may propagate the read request to a node with a W-replica in realm R3. (As noted above, the W-replicas also have the R-role.) The node with the W-replica may satisfy the read request.

Figure 11:
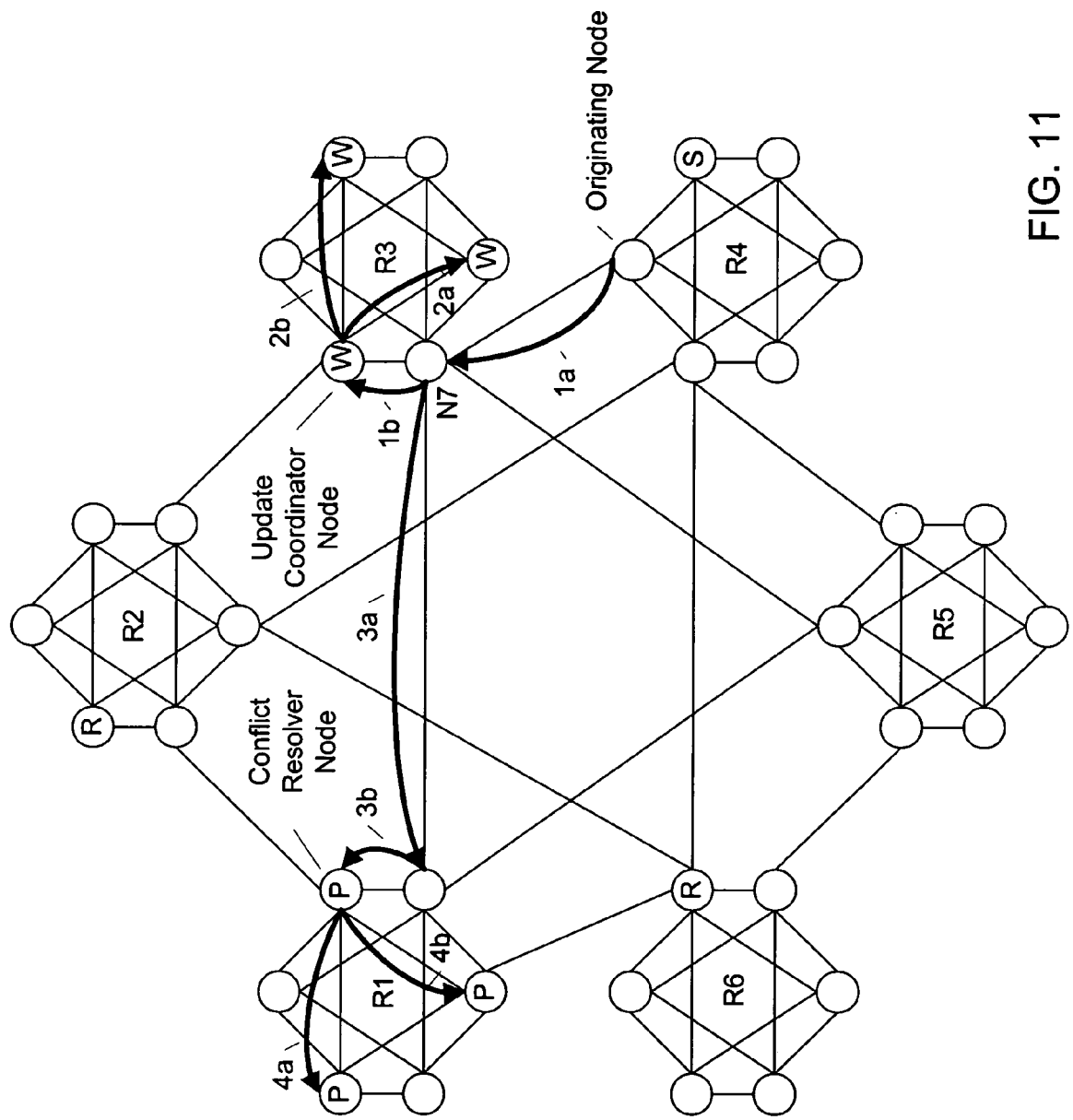
FIG. 11 illustrates an update request according to one embodiment.

FIG. 11 illustrates an update request according to one embodiment. An update request operation may proceed in a number of steps. The following terms provide an overview of an update request operation according to one embodiment:

Originating node: This is the node where the update request originates. It forwards the request to the nearest R-replica node.

R-replica node: This node just forwards the request received from the originating node to the nearest W-replica, referred to as the update coordinator node. Reasons for channeling the update request through the R-replica are discussed below. In FIG. 11, arrows 1a and 1b indicate the update request being sent from the originating node to the update coordinator node. (For simplicity of the diagram, the channeling of the update request through the R-replica is not shown.)

Update coordinator node: This is the W-replica node that receives the request forwarded by the R-replica node. The update coordinator node utilizes a distributed transaction to synchronously update all the W-replicas in that realm, as indicated by arrows 2a and 2b in FIG. 11. After the transaction succeeds, the update coordinator node forwards an update package or message to the P-replicas, as indicated by arrows 3a and 3b in FIG. 11. (In this example, the update message is propagated from the update coordinator node to node N7, and node N7 forward the update message to the P-realm.) In one embodiment, the update message may be forwarded by the update coordinator node to the P-replicas asynchronously so that the client application software that initiated the update request may receive a faster response.

Conflict resolver node: This is the P-replica node that receives the update message from the update coordinator node. The conflict resolver node detects whether there have been any conflicting updates to the same data object from elsewhere in the system. If so, the conflicts may be resolved. The conflict resolver node may utilize a distributed transaction to update all the P-replicas in the P-realm, as indicated by arrows 4a and 4b in FIG. 11. The conflict resolver node may also broadcast the (conflict-resolved) update message to all the nodes in the system that have the R-role. This results in all the W-replicas as well as the R-replicas receiving the update message, since the W-replicas publish the R-role. (For simplicity of the diagram, the broadcast of the update message to all the nodes that have the R-role is not shown.)

R-replica and W-replica nodes: These nodes receive the update message from the conflict resolver node. Each of the nodes may either apply the update locally or invalidate its replica by downgrading to a stale replica.

Details of one embodiment of the algorithms that execute on each of the above nodes are described below.

As described above, the originating node may forward the update request to the nearest R-replica instead of the nearest W-replica. One reason for channeling an update request through the R-replica is so that the R-replica can keep track of the number of update requests received, and can thus use heuristics to determine when it is time for a set of W-replicas to be created locally, similarly as described above with reference to the S-role.

Also, consider a client application that does an update followed immediately by a read. If the update were sent directly to a W-role and the read were sent to an R-role then it is quite likely that the read and write (update) are serviced by different replicas. In this case, it is very likely that the R-replica that services the read request has not yet received the update or invalidate message from the P-replica corresponding to the previous update operation. Hence, the client application will not see its own writes. In an embodiment of the system that has a large number of R-replicas but relatively fewer W-replicas, the probability of this anomalous behavior may be rather high even without any failures or network partitions in the system. In this case, channeling the writes (updates) through the R-replica allows the R-replica to block the next read until the confirmation for the write arrives. Thus the client has a much better probability of seeing its own writes. It is noted that in one embodiment, this behavior may not be guaranteed because it is always possible that the read request might go to a different R-replica than the previous write request (update request). However, in the absence of failures or network partitions the probability of this happening may be low.

Replica Creation

The description above discussed the various kinds of replicas (W, P, R, and S) existing in the system 100 according to one embodiment. This section provides an overview of how and when some of these replicas can be created. It is noted that many alternative heuristics or techniques are contemplated for determining when various types of replicas should be created and for selecting the nodes on which to create the replicas. This section describes exemplary possibilities. To facilitate these heuristics, various statistics may be maintained at different nodes in the system, e.g., using the methods described above with reference to FIGS. 5 and 6.

In general P-replicas are minimum requirements for long-term existence and health of a data object. N(P) P-replicas of an object may be created at the time of object creation, and the system may try to ensure that N(P) P-replicas are always alive. All these P-replicas are constrained to be within the same realm. Various heuristics are possible for determining the realm and the nodes on which to create the P-replicas. For example, possibilities include:

Realm in which the create request originated

Realm in which the P-replicas of the parent object (directory) of this object are located Nodes that have maximum free space Nodes on which W-replicas of the parent object (directory) are located It is possible for an object to exist and function properly with just P-replicas. All read as well as write requests get forwarded to the P-replicas. Latencies will be high, and the object will become unavailable if the P-realm is not reachable due to a network partition.

The system may automatically create an R-replica for a data object in a realm when a number of read requests have arrived in some amount or window of time. In one embodiment, the system may fetch all the data associated with the data object from a P-replica and may create a cached replica on a node in the realm, and the node may publish the R-role for that data object. From this point on, all read requests from this realm may get serviced by this R-replica, thus avoiding inter-realm latencies. All readers in this realm may see improved read performance. Updates still have to be sent to the P-replicas. Space occupied by R-replicas that have not been used recently can be reclaimed when necessary by using least-recently-used (LRU) semantics. This ensures that R-replicas do not over-proliferate in the system.

If the system sees a number of update requests for an object in some amount or window of time from a realm that does not have any W-replicas for the object, the system may decide to create W-replicas in the realm locally. Let us assume that the realm already has an R-replica. In this case, new R-replicas may be created within the realm so that the total number of replicas in the realm becomes N(W). In the context of a distributed transaction, all the R-replicas may then assert the W-role to become W-replicas. At this point, their local version numbers may be initialized to 0, and the local updates log is empty.

In another embodiment, W-replicas may be created if an update request arrives in a realm that cannot reach any W-replicas (due to network partitioning), but does have access to an R-replica. In that case, W-replicas can be created using the R-replica, as described in the previous paragraph.

The algorithm described below for a W-replica to respond to an update message received from a P-replica can be modified so that when an update message is received by a W-replica and the W-replica notices that it has not seen any local update activity in a long time, it can delete itself. This ensures that W-replicas do not overrun the system. Note that a W-replica can only delete itself if it does not have the P-role and if its local update log is empty. Also, dropping a W-role may be performed transactionally, i.e., each of the N(W) W-replicas in a realm may drop their W-role together. One of the W-replicas can also choose to just downgrade itself to an R-replica instead of deleting itself, if appropriate.

In one embodiment, the system may be operable to determine a situation in which a large number of updates are originating in a particular W-realm, while not much update activity is being initiated in the P-realm. In this case, the system may be operable to migrate the P-replicas from the current P-realm to the W-realm. Migrating the P-replicas is a heavyweight operation. The system may first ensure that the W-replicas in the W-realm are up-to-date (i.e., local updates log is empty, and the confirmed version number matches the version number in the P-realm). If N(P)>N(W), then new W-replicas may be created in the W-realm to bring the number up to N(P). The recent update logs maintained by the P-replicas may also be migrated to the W-replicas. After all this is done, the P-role can be migrated. These operations may occur in the context of a distributed transaction.

Partial Replicas

It is not necessary for an R-replica to always contain all the data of a file or other data object. In one embodiment, a replica at a given node may include only parts of the data of the file or data object. The replica may keep track of which data blocks are cached locally and which are not. In case a read request is for data that is entirely included within the blocks cached locally, the request can be satisfied locally. If not, the relevant blocks can be fetched from a P-replica and added to the local cache. After this the request can be satisfied locally.

This has the advantage that the initial reads of a file or other data object from a remote realm become much cheaper because the entire file does not have to be fetched before the read can be satisfied. In case there are applications that access only small parts of large files, this optimization could significantly reduce the network bandwidth used.

The disadvantage of this approach is that it reduces the availability of the data. In case the local replica does not have some parts of a file, and if a P-replica is not reachable due to network bandwidth, then the read request will fail.

Various heuristics may be used to determine when a partial replica should be created and when a replica should be a full replica. For example, in the case of small files, a full replica may be preferable. In the case of large files, initially a partial replica can be created, and then it can be dynamically converted to a full replica if the number of accesses to that replica crosses some threshold. It is noted that the W-replicas could also be partial replicas, and similar heuristics can be applied.

Message Addressing

In one embodiment nodes may store routing information for each file or data object indicating how to route messages to the various roles associated with the file. For example, in one embodiment each file or data object may have an associated tree. When performing a send operation to send a message to a role for a particular file or data object, a node may specify the ID of the tree on which to perform the send operation. In one embodiment, the ID of the tree associated with each file or data object may be the same as the ID of the file or data object. Thus, to send a message to a role for a particular file or data object, a node may need to know the ID of the file or data object.

In one embodiment, an application may utilize well-known IDs for various files or data objects so that each node knows the IDs for files or data objects it needs to access. In another embodiment, a node may possess other information regarding a file or data object such as its name or other meta-data and may utilize a global name space service to lookup the file or data object ID. The global name space service may provide a global mapping service that maps a human-readable name for each file or data object to the file or data object's ID. For example, in one embodiment each file or data object may have a hierarchical pathname in the form:

$/p_0/p_1/p_2/\ldots/p_{n-1}/p_n,$ where each $p_i$ is a pathname component, and the global name space service may map the pathname to the file ID. In one embodiment, the global name space service may be designed to perform name lookups using only nodes in the local realm.

Role-Based Addressing

In the distributed file sharing model described above, nodes send various control messages to location-independent addresses associated with other nodes. For example, when a node wants to perform a write operation to a file, the node may send an update request message to a location-independent address associated with nodes that store writable replicas of the file. A location-independent address may comprise information usable to address a message without specifying where the message recipient is located in the network, e.g., without specifying a particular node in the network. Thus, using location-independent addresses allows messages to be sent from a sender node to one or more destination nodes without the sender node being required to know which specific nodes are the destination nodes. For example, a location-independent address may simply specify a property or entity that is associated with the destination nodes, and the message addressed to this address may be routed to each node that has the associated property or entity. As discussed above, one example of a location-independent address is a "role".

The T&R layer software 130 discussed above may include an interface allowing clients (e.g., the object layer software 129 and/or the client application software 128 discussed above) to utilize the T&R layer software. The T&R layer software 130 interface may allow clients to create a role on one or more nodes on a tree (more specifically, an instance of the role may be created on each of the one or more nodes). Each node on which an instance of the role is created is said to have the role or assert the role. In one embodiment, each role may be identified using a string, e.g., the name of the role, such as "P", "W", "R", etc. In other embodiments, roles may be identified in other ways, e.g., using integers.

Thus, a complete network address for sending a message may comprise information identifying a tree and a role on the tree. For example, in one embodiment the tree may be identified using a tree ID, such as a 128-bit Universally Unique ID (UUID), and a role may be identified using a variable length string. As discussed above, each file or data object may have an associated tree, where the tree ID is the same as the file or data object ID.

In another embodiment, a network address for sending a message may also include information identifying a portion of software to receive the message. For example, the network address may also include information identifying a protocol ID associated with software that utilizes the T&R layer. Multiple protocols may utilize the same tree. Thus, each message may be sent on a particular tree and, more particularly, to a particular set of nodes on the tree, i.e., the nodes having the specified role. As the message arrives to each node on the specified tree and having the specified role, the protocol ID may be used to determine which protocol on the node or which portion of software receives the message. In another embodiment there may not be multiple protocols, or a message may be sent without specifying a particular protocol ID. If no protocol ID is specified, the message may be delivered to all protocols bound to the tree.

Any semantic meaning associated with a role may be done so by higher-level software and not by the T&R layer. For example, roles such as "P" or "W" may appear to the T&R layer as just two different strings that each designate a separate target on a tree for message transfers. The T&R layer may treat client messages simply as a set of bytes.

Sending messages to roles instead of directly to nodes may have a number of advantages. For example, a given role may be assigned to any tree vertex (node), and the role may move from node to node dynamically. Also, a single role may be assigned to multiple tree nodes. Thus, a message addressed to the role may reach each of the nodes which have the role.

Role-based addressing may also allow distributed software to run in a peer-to-peer manner. Nodes do not need to keep track of global state, such as knowing which other nodes are present on the network or which roles are bound to which nodes. A node may simply accomplish an operation by routing a message to a particular role, without needing to know which particular node or nodes have the role.

It is noted that various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A storage medium storing program instructions executable by a plurality of nodes, wherein the plurality of nodes is segmented into a plurality of realms, wherein each realm includes a subset of the plurality of nodes, wherein the plurality of realms includes a first realm including a first node of the plurality of nodes and a second realm including a second node and third node of the plurality of nodes, wherein a first replica of a file is stored on the first node in the first realm, wherein no replicas of the file are stored on any of the nodes in the second realm;

wherein the program instructions are executable by the second node in the second realm to create a location-independent address for monitoring read requests for the file by nodes in the second realm;

wherein the program instructions are executable by the third node in the second realm to send a read request message requesting to read from the file to the location-independent address;

wherein the program instructions are further executable by the second node in the second realm to:

update stored statistical information regarding read accesses for the file by nodes in the second realm in response to receiving the read request message in order to indicate that a new read request for the file was received;

forward the read request message to the first node in the first realm;

wherein the program instructions are executable by the first node in the first realm to respond to the read request message by returning requested data from the first replica of the file stored on the first node to the third node in the second realm.

2. The storage medium of claim 1, wherein the program instructions are further executable by the second node in the second realm to:

determine that the stored statistical information regarding read accesses for the file by nodes in the second realm indicates that a threshold level of read accesses for the file has been surpassed;

in response to determining that the threshold level of read accesses for the file by nodes in the second realm has been surpassed, initiate creation of a second replica of the file on a node in the second realm.

3. The storage medium of claim 1, wherein the read request message does not specify the second node as a recipient of the read request message.

4. The storage medium of claim 1, wherein the program instructions are further executable by the third node in the second realm to address the read request message to the location-independent address by using a name of the location-independent address as a destination for the read request message.

5. The storage medium of claim 1, wherein each realm of the plurality of realms includes a different local area network (LAN);

wherein the first node in the first realm is in a first LAN;

wherein the second and third nodes in the second realm are in a second LAN.

6. A method implemented by a plurality of nodes, wherein the plurality of nodes is segmented into a plurality of realms, wherein each realm includes a subset of the plurality of nodes, wherein the plurality of realms includes a first realm including a first node of the plurality of nodes and a second realm including a second node and third node of the plurality of nodes, wherein a first replica of a file is stored on the first node in the first realm, wherein no replicas of the file are stored on any of the nodes in the second realm, wherein the method comprises:

the second node in the second realm creating a location-independent address for monitoring read requests for the file by nodes in the second realm;

the third node in the second realm to send a read request message requesting to read from the file to the location-independent address;

the second node in the second realm updating stored statistical information regarding read accesses for the file by nodes in the second realm in response to receiving the read request message in order to indicate that a new read request for the file was received;

the second node in the second realm forwarding the read request message to the first node in the first realm; and the first node in the first realm responding to the read request message by returning requested data from the first replica of the file stored on the first node to the third node in the second realm.

7. The method of claim 6, further comprising:

the second node in the second realm determining that the stored statistical information regarding read accesses for the file by nodes in the second realm indicates that a threshold level of read accesses for the file has been surpassed;

in response to determining that the threshold level of read accesses for the file by nodes in the second realm has been surpassed, the second node in the second realm initiating creation of a second replica of the file on a node in the second realm.

8. The method of claim 6, wherein the read request message does not specify the second node as a recipient of the read request message.

9. The method of claim 6, further comprising:

the third node in the second realm addressing the read request message to the location-independent address by using a name of the location-independent address as a destination for the read request message.

10. The method of claim 6, wherein each realm of the plurality of realms includes a different local area network (LAN);

wherein the first node in the first realm is in a first LAN;

wherein the second and third nodes in the second realm are in a second LAN.

11. A system comprising:

a plurality of nodes, wherein the plurality of nodes is segmented into a plurality of realms, wherein each realm includes a subset of the plurality of nodes, wherein the plurality of realms includes a first realm including a first node of the plurality of nodes and a second realm including a second node and third node of the plurality of nodes, wherein a first replica of a file is stored on the first node in the first realm, wherein no replicas of the file are stored on any of the nodes in the second realm;

wherein the second node in the second realm is configured to create a location-independent address for monitoring read requests for the file by nodes in the second realm;

wherein the third node in the second realm is configured to send a read request message requesting to read from the file to the location-independent address;

wherein the second node in the second realm is configured to:
- update stored statistical information regarding read accesses for the file by nodes in the second realm in response to receiving the read request message in order to indicate that a new read request for the file was received;
- forward the read request message to the first node in the first realm;

wherein the first node in the first realm is configured to respond to the read request message by returning requested data from the first replica of the file stored on the first node to the third node in the second realm.

12. The system of claim 11,
wherein the second node in the second realm is further configured to:
- determine that the stored statistical information regarding read accesses for the file by nodes in the second realm indicates that a threshold level of read accesses for the file has been surpassed;
- in response to determining that the threshold level of read accesses for the file by nodes in the second realm has been surpassed, initiate creation of a second replica of the file on a node in the second realm.

13. The system of claim 11,
wherein the read request message does not specify the second node as a recipient of the read request message.

14. The system of claim 11,
wherein the third node in the second realm is further configured to address the read request message to the location-independent address by using a name of the location-independent address as a destination for the read request message.

15. The system of claim 11,
wherein each realm of the plurality of realms includes a different local area network (LAN);
wherein the first node in the first realm is in a first LAN;
wherein the second and third nodes in the second realm are in a second LAN.

* * * * *